United States Patent [19]
Kashimada

[11] Patent Number: 6,041,199
[45] Date of Patent: Mar. 21, 2000

[54] IMAGE FORMATION APPARATUS WITH SHEET STACKING CONTROL FEATURE

[75] Inventor: Yoshimasa Kashimada, Yokohama, Japan

[73] Assignee: Canon Kabushiki Kaisha, Tokyo, Japan

[21] Appl. No.: 08/994,432

[22] Filed: Dec. 19, 1997

[30] Foreign Application Priority Data

Dec. 25, 1996 [JP] Japan ................................... 8-357411

[51] Int. Cl.⁷ ............................ G03G 15/00; H04N 1/00
[52] U.S. Cl. ........................ 399/82; 358/1.14; 358/1.15; 399/403
[58] Field of Search ................................ 399/1, 82, 403, 399/408; 271/298; 358/296, 401; 395/101, 112, 113, 114, 116

[56] References Cited

U.S. PATENT DOCUMENTS 4,696,466  9/1987  Yamasaki et al. ..................... 271/98 X
5,442,732  8/1995  Matysek et al. ..................... 395/112 X

FOREIGN PATENT DOCUMENTS 1-197281  8/1989  Japan .

*Primary Examiner*—Joan Pendegrass
*Attorney, Agent, or Firm*—Fitzpatrick, Cella, Harper & Scinto

[57] ABSTRACT

There is provided an image formation apparatus including an image formation unit for forming an image on a sheet, plural trays for stacking the sheets on which the images have been formed by the image formation unit, a detection unit for detecting that the sheets are being stacked in the tray, an input unit for inputting a predetermined instruction, and a control unit for inhibiting the image formation operation of the image formation unit according to that the input unit does not input the predetermined instruction and the detection unit detects the sheet stacking, and allowing the image formation operation of the image formation unit according to that the input unit inputs the predetermined instruction and the detection unit detects the sheet stacking, whereby the sheets can be discharged onto the same tray even if plural image formation instructions are issued from plural application softwares.

11 Claims, 18 Drawing Sheets

PRINTER DRIVER SCREEN IN WHICH SORT PROCESSING AND TRAY NUMBER ARE DESIGNATED

FIG. 12

SORT PRINT JOB IN WHICH THERE IS
TRAY NUMBER DESIGNATION

PRINTER CONTROL COMMAND

SHEET CASSETTE = 1

SHEET SIZE = A4

RESOLUTION = 600

NUMBER OF COPIES = 3

SHEET DIRECTION = VERTICAL

SORT MODE = SORT

TRAY NUMBER = 2

DRAWING INSTRUCTIVE COMMAND

⋮

PRINTER DRIVER SCREEN IN WHICH STAPLE SORT PROCESSING AND TRAY NUMBER ARE DESIGNATED

FIG. 14

STAPLE SORT PRINT JOB IN WHICH THERE IS
TRAY NUMBER DESIGNATION

PRINTER CONTROL COMMAND

SHEET CASSETTE = 1

SHEET SIZE = A4

RESOLUTION = 600

NUMBER OF COPIES = 3

SHEET DIRECTION = VERTICAL

SORT MODE = STAPLE SORT

TRAY NUMBER = 2

DRAWING INSTRUCTIVE COMMAND

STAPLE SORT PRINT JOB IN WHICH THERE IS
NO TRAY NUMBER DESIGNATION

PRINTER CONTROL COMMAND

SHEET CASSETTE = 1

SHEET SIZE = A4

RESOLUTION = 600

NUMBER OF COPIES = 3

SHEET DIRECTION = VERTICAL

SORT MODE = STAPLE SORT

TRAY NUMBER = 0

DRAWING INSTRUCTIVE COMMAND

⋮

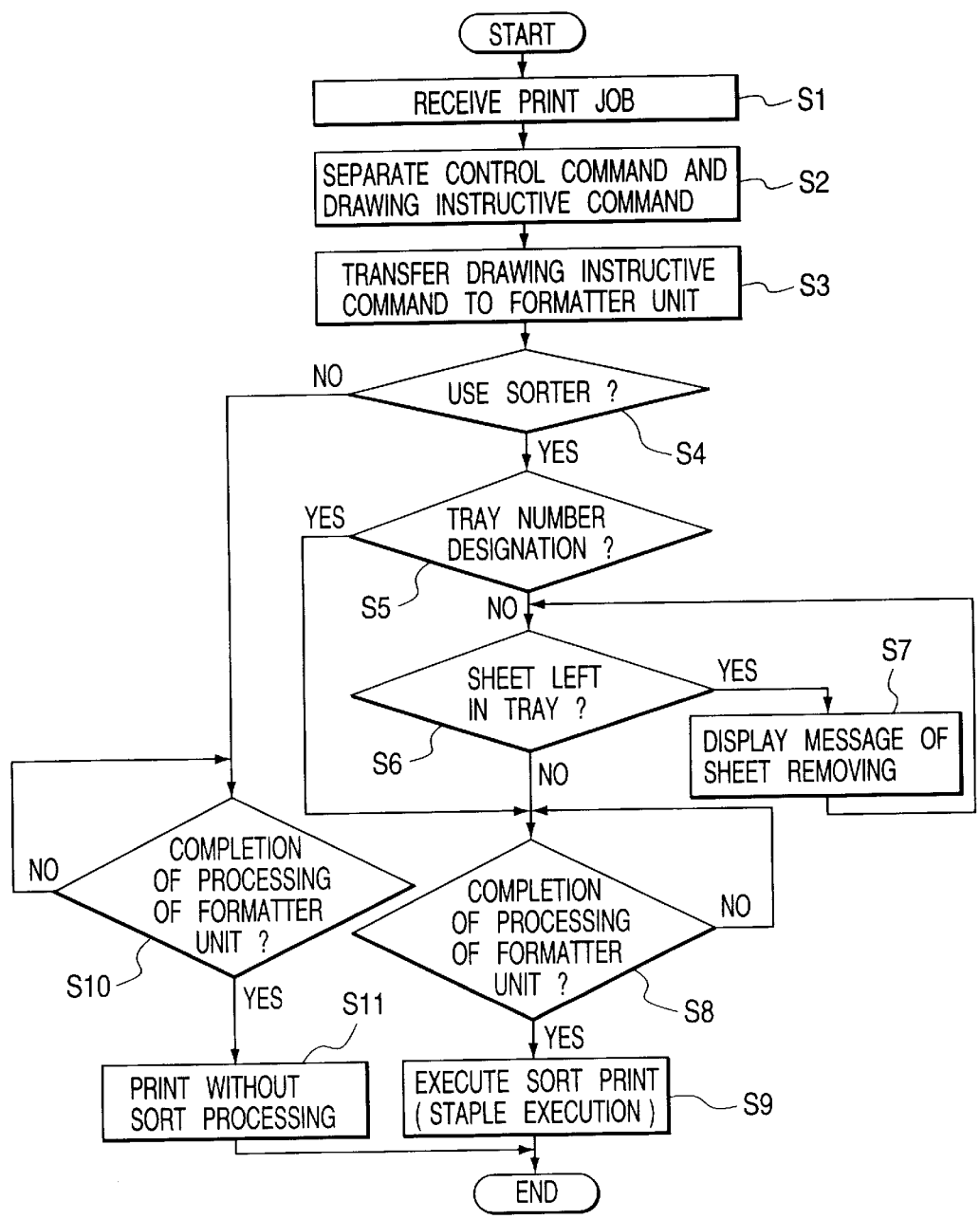

PRINT RESULT BY SORTER
OF THE PRESENT INVENTION

STATUS OF SORTER BEFORE
EXECUTION OF EACH PRINT JOB

RESULT AFTER EXECUTION
OF PRINT JOB 1

RESULT AFTER EXECUTION
OF PRINT JOB 2

RESULT AFTER EXECUTION
OF PRINT JOB 3

RESULT OF EXECUTION OF PRINT
JOB 3 IN WHICH THERE IS NO TRAY
NUMBER DESIGNATION

IMAGE FORMATION APPARATUS WITH SHEET STACKING CONTROL FEATURE

BACKGROUND OF THE INVENTION

1. Field of the Invention

The present invention relates to an image formation apparatus which can detect a stack of sheets on a tray.

2. Related Background Art

Conventionally, it has been known that a sorter is attached to a copy machine to sort copied sheets.

In addition to such a function for sorting the discharged sheets, the sorter can also have a function for executing a processing to staple the sheets stacked on each tray (to be referred as staple processing hereinafter).

Recently, since a facsimile function and a printer function have been added to the copy machine, the sorter is used not only as a copied-sheet discharging destination but also as sheet outputting destinations of a printer, a facsimile and a filing apparatus.

In any case, when the printing is intended to be executed by using the conventional sorter, if the sheets remain on the tray, it is interrupted to execute the printing until the remaining sheets are removed, in order to prevent that, when the copied or printed sheets are subjected to the staple processing, the sheets for which the staple processing is necessary and the other sheets are mixed and then subjected to the staple processing.

However, when the sorter is used in the printer, even if images and text formed based on plural application softwares together construct one volume, the printing processing is not executed if the sheets are not removed from the sorter every time the printing based on each application software terminates. Therefore, such the printing can not be effectively utilized.

SUMMARY OF THE INVENTION

An object of the present invention is to provide an image formation apparatus which solved the above-described conventional problem.

An another object of the present invention is to provide the image formation apparatus which can discharge sheets onto a same tray even if image formation instructions are issued from plural application softwares.

The above and other objects, features, and advantages of the present invention will be apparent from the following detailed description and the appended claims in conjunction with the accompanying drawings.

BRIEF DESCRIPTION OF THE DRAWINGS

FIG. 12 is a view for explaining a sort print job in which there is the tray destination number, in the above embodiment;

FIG. 14 is a view for explaining a staple sort print job in which there is the tray designation number, in the above embodiment;

FIG. 16 is a view for explaining the staple sort print job in which there is no tray designation number, in the above embodiment;

FIG. 17 is a flowchart showing an operation of the core unit to control the sort processing, in the above embodiment.

DETAILED DESCRIPTION OF THE PREFERRED EMBODIMENTS

Figure 1:
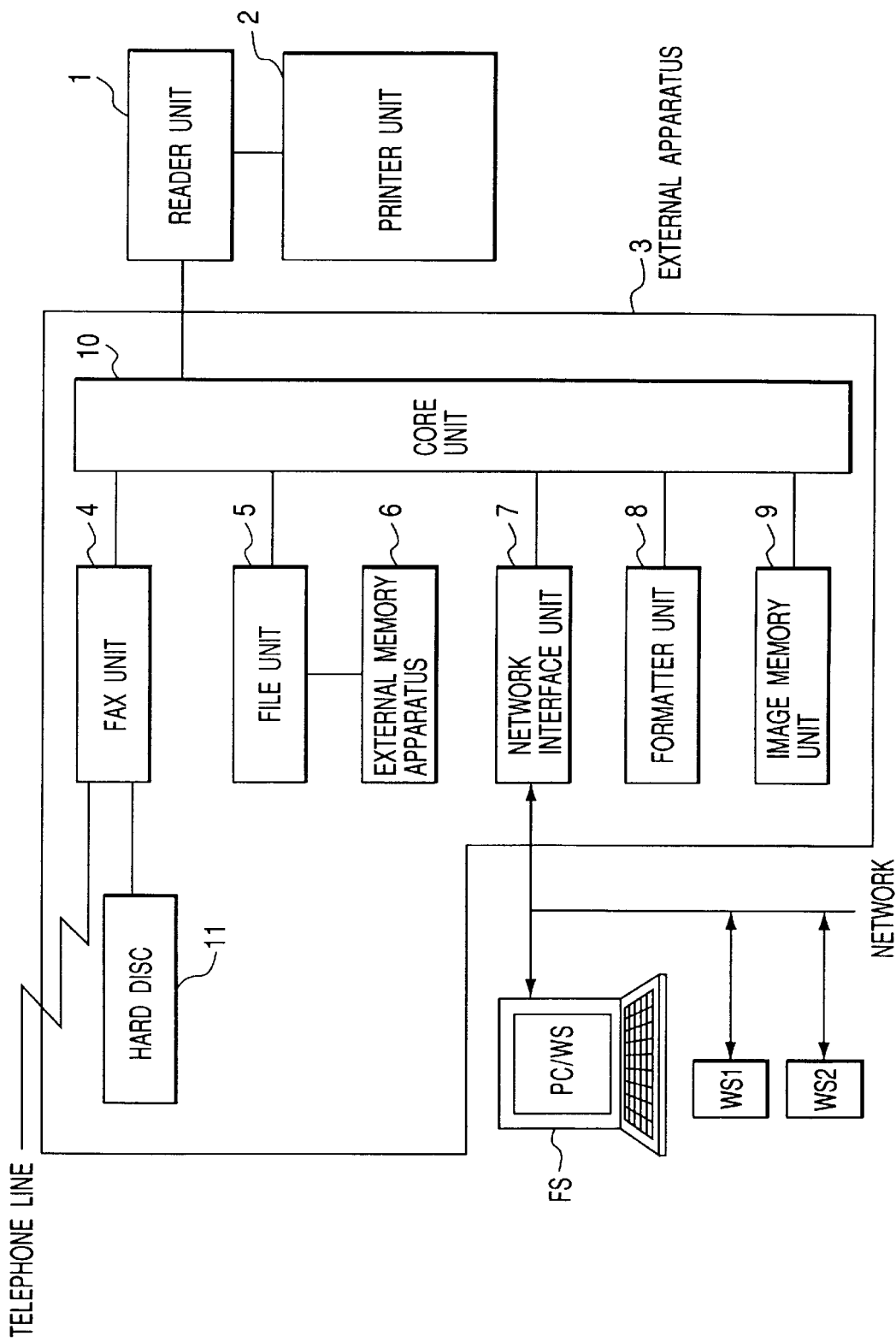
FIG. 1 is a block diagram showing structure of a multi-functional image processing according to one embodiment of the present invention.

FIG. 1 is a block diagram showing structure of an image formation system according to an embodiment of the present invention.

In FIG. 1, an image input apparatus (to be referred as reader unit hereinafter) 1 converts an original into image data, and an image output apparatus (to be referred as printer unit hereinafter) 2 which has plural kinds of recording sheet cassettes outputs the image data onto a recording sheet as a visible image in response to a print instruction.

An external apparatus 3 which is electrically connected to the reader unit 1 has various functions. That is, the external apparatus 3 has a facsimile unit 4, a file unit 5, an external memory apparatus 6 which is connected to the file unit 5, a network interface unit 7 which connects a network (NETWORK), a formatter unit 8 which produces the visible image based on information from computers WS1 and WS2, an image memory unit 9 which stores information from the reader unit 1 and further temporarily stores the information sent from the computers WS1 and WS2, a core unit 10 which controls the above-described various functions, and the like. Further, reference numeral FS denotes a file server.

Figure 2:
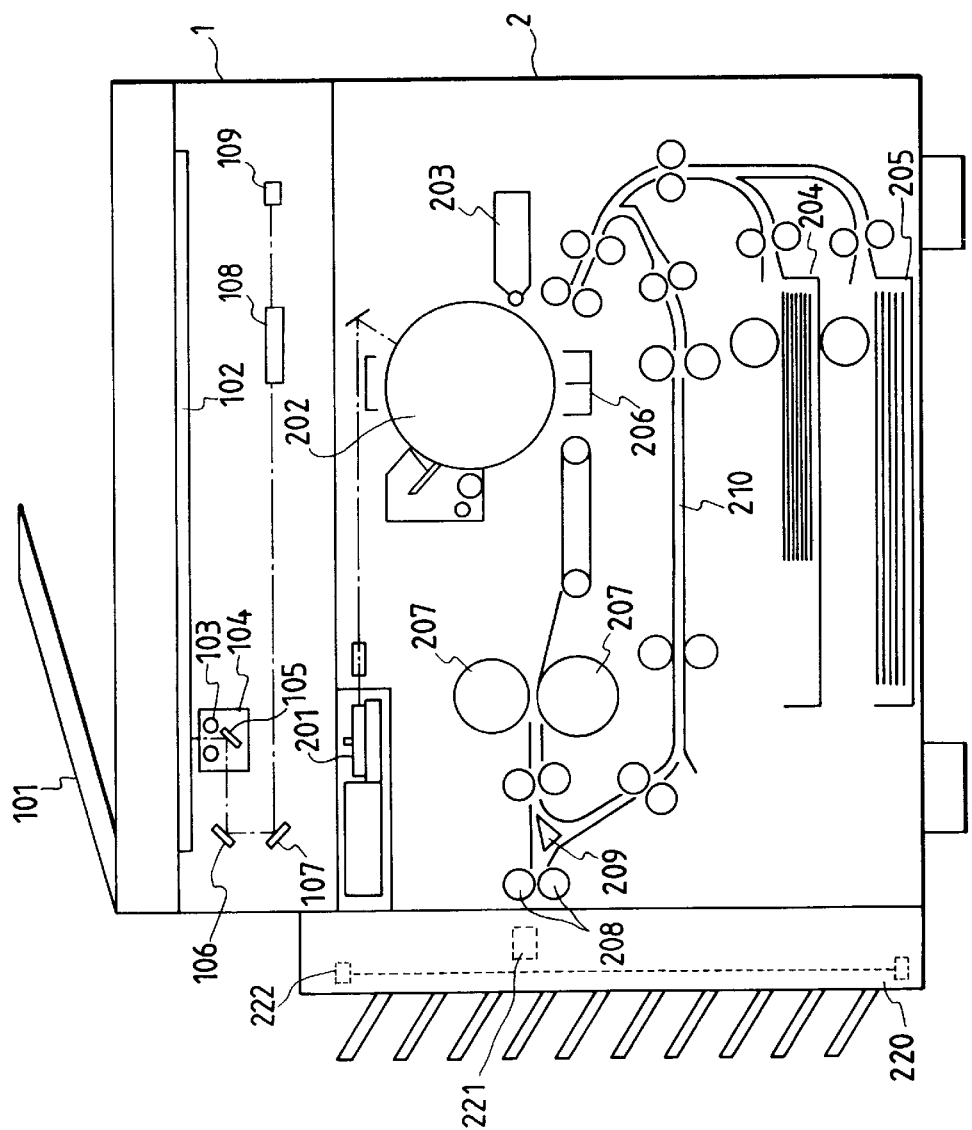
FIG. 2 is a sectional view showing structure of a reader unit and a printer unit in the above embodiment.

FIG. 2 is a sectional view showing structure of the reader unit 1 and the printer unit 2.

The original mounted on an original feeding apparatus 101 is sequentially fed one by one onto an original mounting glass board 102. When the original is fed, a lamp 103 of a scanner unit 104 is turned on, and also the scanner unit 104 is moved to irradiate the original. Then, reflection light from the original passes through a lens 108 sequentially through mirrors 105, 106 and 107, and thereafter inputted to a CCD image sensor unit 109 (to be referred as CCD hereinafter).

Figure 3:
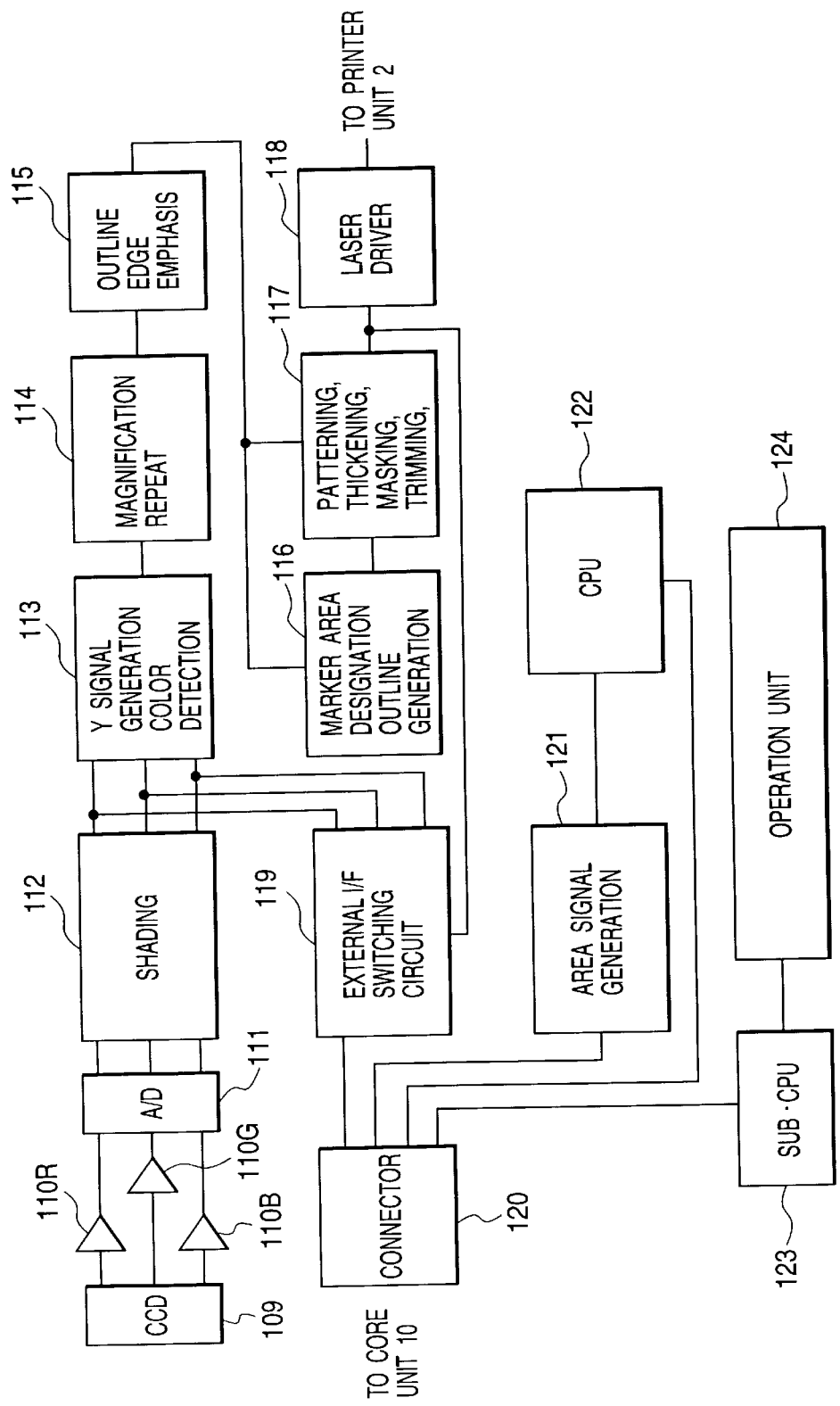
FIG. 3 is a block diagram showing structure of a signal processing unit of the printer unit in the above embodiment.

FIG. 3 is a block diagram showing the structure of a signal processing circuit in the reader unit 1.

Image information inputted to the CCD 109 is subjected to photoelectric conversion to be converted into electrical signals as color information. Then, the color information from the CCD 109 is amplified in accordance with an input signal level of an A/D converter 111 by subsequent amplifiers 110R, 110G and 110B. Subsequently, output signals from the A/D converter 111 are inputted to a shading circuit 112. In the circuit 112, unevenness in light distribution of the lamp 103 and unevenness in sensitivity of the CCD 109 are corrected.

Signals from the shading circuit 112 are inputted to an Y (yellow) signal generation and color detection circuit 113 and an external interface switching circuit 119, respectively.

The Y signal generation and color detection circuit 113 performs calculation on the signals from the shading circuit 112 by using a following equation, to obtain an Y signal.

$$Y=0.3R+0.6G+0.1B$$

Further, the Y signal generation and color detection circuit 113 has a color detection circuit which separates colors of the R (red), G (green) and B (blue) signals into seven colors, and outputs signals each corresponding to each color.

The output signal from the Y signal generation and color detection circuit 113 is inputted to a magnification and repeat circuit 114. Then, magnification or zooming in a sub-scanning direction is performed based on scanning speed, and magnification or zooming in a main-scanning direction is performed by the magnification and repeat circuit 114. Further, plural identical image can be outputted by the magnification and repeat circuit 114.

An outline and edge emphasis circuit 115 emphasizes a high-frequency component of a signal from the magnification and repeat circuit 114, to obtain edge emphasis and outline information. A signal from the outline and edge emphasis circuit 115 is inputted to a marker area designation and outline generation circuit 116 and a patterning, thickening, masking and trimming circuit 117, respectively.

The marker area designation and outline generation circuit 116 reads a portion on the original which portion was written by a designated-color marker pen, to generate marker outline information. Then, the subsequent patterning, thickening, masking and trimming circuit 117 performs thickening (or fattening), masking and trimming on the basis of the generated outline information. Further, the circuit 117 performs patterning on the basis of the color detection signal from the Y signal generation and color detection circuit 113.

An output signal from the patterning, thickening, masking and trimming circuit 117 is inputted to a laser driver circuit 118, whereby the variously processed signal is converted into a signal for driving a laser beam. The output signal from the laser driver circuit 118 is inputted to the printer unit 2 and subjected to the image formation to produce the visible image.

Subsequently, it will be explained hereinafter the external interface switching circuit 119 which interfaces with the external apparatus 3.

In case of outputting the image information from the reader unit 1 to the external apparatus 3, the external interface switching circuit 119 outputs the image information from the patterning, thickening, masking and trimming circuit 117 to a connector 120. Further, in case of inputting the image information from the external apparatus 3 to the reader unit 1, the external interface switching circuit 119 inputs the image information from the connector 120 to the Y signal generation and color detection circuit 113. The connector 120 is connected to the core unit 10.

The above-described image processes are performed on the basis of instructions of a CPU 122, and various timing signals necessary for such the image processes are generated by an area signal generation circuit 121 on the basis of values set by the CPU 122. Further, a communication to the external apparatus 3 is performed by using a communication function provided in the CPU 122. A sub CPU 123 controls an operation unit 124, and a communication to the external apparatus 3 is performed by using a communication function provided in the sub CPU 123.

Subsequently, the structure and operation of the printer unit 2 will be explained with reference to FIG. 2.

The signal inputted in the printer unit 2 is converted into an optical signal by an exposure control unit 201 to irradiate a photosensitive body 202 according to the image signal. A latent image which was formed on the photosensitive body 202 by irradiated light is developed by a development unit 203. A transfer sheet is carried from a transfer sheet stacking unit 204 or 205 at a timing in synchronism with developing timing, and thus the developed image is transferred onto the transfer sheet by a transfer unit 206.

After the transferred image is fixed to the transfer sheet by a fixing unit 207, the obtained sheet is discharged outward from a sheet discharge unit 208. The transfer sheet outputted from the sheet discharge unit 208 is discharged to each bin when a sort function of a sorter 220 is executed, or to an upper-most bin of the sorter 220 when the sort function is not executed. Since the sorter 220 has a stapler 221, a stapling processing can be executed for the transfer sheets. Further, the sorter 220 has a sensor 222 which detects that the sheets remain in any bin.

Subsequently, a method for outputting the sequentially read images onto both sides of one output sheet will be explained.

After the output sheet which was fixed by the fixing unit 207 is once carried up to the sheet discharge unit 208, a sheet feeding direction is inverted, and the output sheet is carried up to a transfer sheet re-feeding stacking unit 210 through a feeding direction switching member 209. Then, when the next original is prepared, such that the original image is read in the same manner as that in the above-described processing. However, in this case, the transfer sheet is fed from the transfer sheet re-feeding stacking unit 210. As a result, the two original images can be outputted onto the front and back sides of the same output sheet.

Subsequently, the external apparatus 3 will be explained hereinafter.

The external apparatus 3 is connected to the reader unit 1 by means of a cable, and the various signals and functions are controlled by the core unit 10 in the external apparatus 3. That is, in the external apparatus 3, there are provided the facsimile unit 4 which performs facsimile transmission and reception, the file unit 5 which converts the various original information into the electrical signals and stores the obtained electrical signals, the formatter unit 8 which expands code information from the computer to image information, the computer interface unit 7 which interfaces with the computer, the image memory unit 9 which stores the information from the reader unit 1 and temporarily stores the information sent from the computer, the core unit 10 which controls the above-described various functions, and the like.

Figure 4:
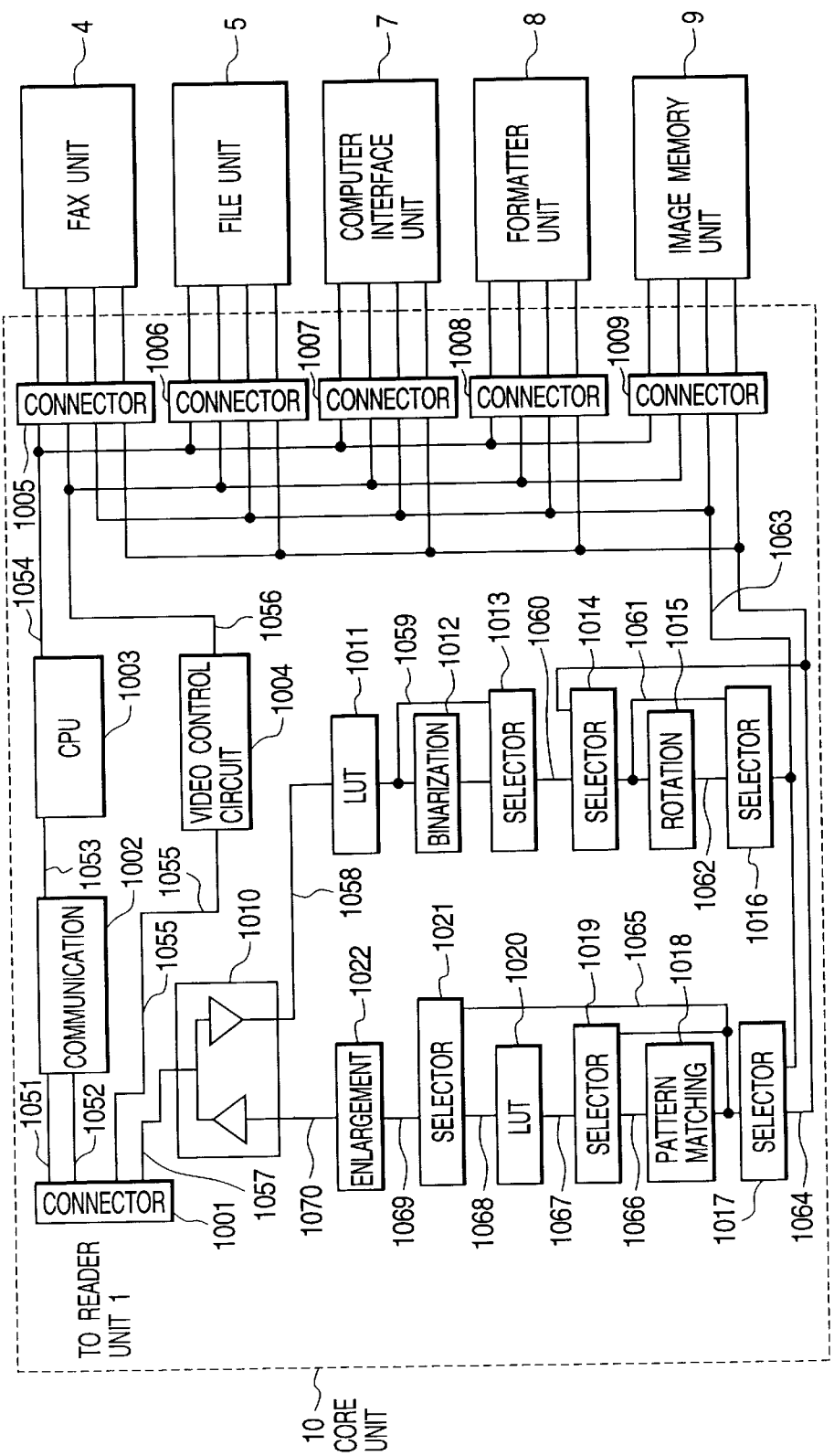
FIG. 4 is a block diagram showing structure of a core unit in the above embodiment.

FIG. 4 is a block diagram showing the detailed structure of the core unit 10.

A connector 1001 of the core unit 10 which is connected to the connector 120 of the reader unit 1 by means of a cable contains four kinds of signals. That is, a signal 1057 is the eight-bit multivalue video signal, and a signal 1055 is the control signal for controlling the video signal. In the embodiment of the present invention, it should be noted that the identical reference numeral is applied to both the signal itself and its signal line (or bus), as a matter of convenience. For example, as described later, the signal 1057 flows in a two-way video signal line 1057.

Further, a signal 1051 is the signal for communicating with the CPU 122 in the reader unit 1, and a signal 1052 is the signal for communicating with the sub CPU 123 in the reader unit 1. The signals 1051 and 1052 are subjected to a communication protocol processing by a communication IC 1002, to transfer communication information to a CPU 1003 through a CPU bus 1053.

Since the signal 1057 flows in the two-way video signal line 1057, the information from the reader unit 1 can be received by the core unit 10, and the information from the core unit 10 can be outputted to the reader unit 1.

The signal 1057 is connected to a buffer 1010. Then, in the buffer 1010, the signal 1057 (two-way signal) is separated into one-way signals 1058 and 1070. The signal 1058 which is the eight-bit multivalue video signal from the reader unit 1 is inputted to a next-stage LUT (look-up table) 1011. In the LUT 1011, the image information from the reader unit 1 is converted into a desired value by using a contained look-up table.

An output signal 1059 from the LUT 1011 is inputted to a binarization circuit 1012 or a selector 1013. The binarization circuit 1012 has a simple binarization function for binarizing the multivalue signal 1059 with a fixed slice level, a binarization function for binarizing the signal with a variation slice level which varies from a value of a pixel around a remarked (i.e., objective) pixel, and a binarization function for binarizing the signal in an error diffusion method.

When the binarized information is "0", it is converted into a multivalue signal of "00H". On the other hand, when the binarized information is "1", it is converted into the multivalue signal of "FFH". Then, the obtained multivalue signal is inputted to the next-stage selector 1013, and the selector 1013 selects either the signal from the LUT 1011 or the output signal from the binarization circuit 1012. An output signal 1060 from the selector 1013 is inputted to a selector 1014.

In response to the instruction from the CPU 1003, the selector 1014 selects a signal 1064 which is obtained by inputting the output video signals from the facsimile unit 4, the file unit 5, the computer interface unit 7, the formatter unit 8 and the image memory unit 9 respectively through connectors 1005, 1006, 1007, 1008 and 1009, or the output signal 1060 from the selector 1013.

An output signal 1061 from the selector 1014 is inputted to a rotation circuit 1015 or a selector 1016. The rotation circuit 1015 has a function for rotating the input image signal respectively by +90°, −90° and +180°.

After the output information from the reader unit 1 is converted into the binary signal by the binarization circuit 1012, the rotation circuit 1015 stores the obtained binary signal as the information from the reader unit 1. Subsequently, in response to the instruction from the CPU 1003, the rotation circuit 1015 rotates and reads the stored information.

The selector 1016 selects either an output signal 1062 from the rotation circuit 1015 or the input signal 1061 to the rotation circuit 1015, in order to output, as a signal 1063, the selected signal to the connector 1005 to the facsimile unit 4, the connector 1006 to the file unit 5, the connector 1007 to the computer interface unit 7, the connector 1008 to the formatter unit 8, the connector 1009 to the image memory unit 9, and the selector 1017 respectively.

The signal 1063 flows in a sync-type eight-bit one-way video bus 1063 which transfers the image information from the core unit 10 to the facsimile unit 4, the file unit 5, the computer interface unit 7, the formatter unit 8 and the image memory unit 9 respectively.

On the other hand, the signal 1064 flows in a sync-type eight-bit one-way video bus 1064 which transfers the image information from the facsimile unit 4, the file unit 5, the computer interface unit 7, the formatter unit 8 and the image memory unit 9 respectively. The sync-type eight-bit one-way video buses 1063 and 1064 are controlled by a video control circuit 1004. Concretely, these buses 1063 and 1064 are controlled in response to an output signal 1065 from the video control circuit 1004.

In addition, a signal 1054 is connected to the connectors 1005 to 1009 respectively. The signal 1054 flows in a two-way 16-bit CPU bus 1054 which manages a data command in an asynchronous system. The information transferring between the core unit 10 and the facsimile unit 4, the file unit 5, the computer interface unit 7, the formatter unit 8 and the image memory unit 9 can be performed by the above-described two video buses 1063 and 1064 and the CPU bus 1054.

The signal 1064 from the facsimile unit 4, the file unit 5, the computer interface unit 7, the formatter unit 8 and the image memory unit 9 is inputted to the selectors 1014 and 1017. The selector 1016 inputs the signal 1064 to the next-stage rotation circuit 1015 in response to the instruction from the CPU 1003.

The selector 1017 selects the signals 1063 and 1064 in response to the instruction from the CPU 1003. An output signal 1065 from the selector 1017 is inputted to a pattern matching circuit 1018 and a selector 1019. The pattern matching circuit 1018 performs pattern matching between a pattern of the input signal 1065 and a predetermined pattern. Then, when the pattern matching can be obtained, the circuit 1018 outputs a predetermined multivalue signal to a signal line 1066. On the other hand, when the pattern matching can not be obtained, the circuit 1018 outputs the input signal 1065 to the signal line 1066 as it is.

The selector 1019 selects the signals 1065 and 1066 in response to the instruction from the CPU 1003. An output signal 1067 from the selector 1019 is inputted to a next-stage LUT 1020.

Then, the LUT 1020 converts the input signal 1067 in accordance with a printer characteristic, in case of outputting the image information to the printer unit 2.

A selector 1021 selects an output signal 1068 from the LUT 1020 and the signal 1065, in response to the instruction from the CPU 1003. An output signal 1068 from the selector 1021 is inputted to a next-stage enlargement circuit 1022.

The enlargement circuit 1022 can set enlargement magnification independently in the X and Y directions, in response to the instruction from the CPU 1003. In this case, a primary linear interpolation method is applied as an enlargement method of the circuit 1022. The output signal 1070 from the enlargement circuit 1022 is inputted to the buffer 1010.

In response to the instruction from the CPU 1003, the input signal 1070 of the buffer 1010 is outputted as the two-way signal 1057 to be sent to the printer unit 2 through the connector 1001, and then printed out.

Hereinafter, flows of the various signals between the core unit 10 and each unit will be explained.

[Operation of Core Unit 10 Based on Information of Facsimile Unit 4]

Initially, it will be explained a case where the information is outputted to the facsimile unit 4. The CPU 1003 communicates with the CPU 122 of the reader unit 1 through the communication IC 1002, to generate an original scanning instruction. In the reader unit 1, the scanner unit 104 scans the original in response to the original scanning instruction, to output the image information to the connector 120.

The reader unit 1 and the external apparatus 3 are connected to each other by means of the cable, whereby the image information from the reader unit 1 is inputted to the connector 1001 of the core unit 10. The input image information of the connector 1001 is then inputted to the buffer 1010 through the multivalue eight-bit signal line 1057.

In response to the instruction from the CPU 1003, the buffer 1010 inputs the two-way signal 1057 to the LUT 1011 as the one-way signal through the signal line 1058. Then, in the LUT 1011, the image information from the reader unit 1 is converted into a desired value by using the look-up table. For example, a background in the original can be skipped. The output signal 1059 from the LUT 1011 is inputted to the next-stage binarization circuit 1012.

The binarization circuit 1012 converts the eight-bit multivalue signal 1059 into the binarization signal. The binarization circuit 1012 performs the conversion to generate the two kinds of multivalue signals, i.e., "00H" when the binarized signal is "0" and "FFH" when the binarized signal is "1". The output signal from the binarization circuit 1012 is inputted to the rotation circuit 1015 or the selector 1016 through the selectors 1013 and 1014.

The output signal 1062 from the rotation circuit 1015 is also inputted to the selector 1016. Thus, the selector 1016 selects either the signal 1061 or 1062. The CPU 1003 communicates with the facsimile unit 4 through the CPU bus 1054, and thus such the signal selection is determined. The output signal 1063 from the selector 1016 is sent to the facsimile unit 4 through the connector 1005.

Subsequently, it will be explained hereinafter a case where the information from the facsimile unit 4 is received.

The image information from the facsimile unit 4 is transferred to the signal line 1064 through the connector 1005. The signal 1064 is inputted to the selectors 1014 and the 1017. When the image at the facsimile reception time is rotated and then outputted to the printer unit 2, the rotation circuit 1015 performs the rotation processing on the signal 1064 inputted to the selector 1014, in response to the instruction from the CPU 1003. Then, the output signal 1062 from the rotation circuit 1015 is inputted to the pattern matching circuit 1018 through the selectors 1016 and 1017.

When the image at the facsimile reception time is outputted to the printer unit 2 as it is, the signal inputted to the selector 1017 is further inputted to the pattern matching circuit 1018 in response to the instruction from the CPU 1003.

The pattern matching circuit 1018 has a function for smoothing an indention or sawtooth phenomenon of the image at the facsimile reception time. The pattern-matching processed signal is inputted to the LUT 1020 through the selector 1019.

The table in the LUT 1020 can be changed by the CPU 1003, in order to output the facsimile-received image to the printer unit 2 at a desired density. The output signal 1068 from the LUT 1020 is inputted to the enlargement circuit 1022 through the selector 1021.

The enlargement circuit 1022 performs the enlargement processing on the eight-bit multivalue signal having two values (00H, FFH) in the primary linear interpolation method. The eight-bit multivalue signal which is outputted from the enlargement circuit 1022 and has the numerous values is sent to the reader unit 1 through the buffer 1010 and the connector 1001.

The reader unit 1 inputs this signal to the external interface switching circuit 119 through the connector 120. The external interface switching circuit 119 inputs the signal from the facsimile unit 4 to the Y signal generation and color detection circuit 113. The output signal from the Y signal generation and color detection circuit 113 is subjected to such the processing as described above, and then outputted to the printer unit 2. Thus, the image formation is performed on the output sheet.

[Operation of Core Unit 10 Based on Information of File Unit 5]

It will be explained a case where the information is outputted to the file unit 5.

The CPU 1003 communicates with the CPU 122 of the reader unit 1 through the communication IC 1002 to generate the original scanning instruction. In the reader unit 1, the scanner unit 104 scans the original in response to the original scanning instruction, to output the image information to the connector 120. The reader unit 1 and the external apparatus 3 are connected to each other by means of the cable, whereby the image information from the reader unit 1 is inputted to the connector 1001 of the core unit 10.

The input image information inputted to the connector 1001 is then converted into the one-way signal 1058 by the buffer 1010. The signal 1058 which the eight-bit multivalue signal is converted into the desired signal by the LUT 1011. The output signal 1059 of the LUT 1011 is inputted to the connector 1006 through the selectors 1013, 1014 and 1016. That is, the eight-bit multivalue signal 1059 is transferred to the file unit 5 as it is, without using the functions of the binarization circuit 1012 and the rotation circuit 1015.

On the other hand, when the CPU 1003 communicates with the file unit 5 through the CPU bus 1054 to perform filing of the binarization signal, the functions of the binarization circuit 1012 and the rotation circuit 1015 are used. Since the actual binarization processing and the rotation processing are substantially the same as those in the case of facsimile unit 4, the detailed explanation thereof is omitted.

Subsequently, it will be explained a case where the information from the file unit 5 is received.

The image information from the file unit 5 is inputted, as the signal 1064, to the selector 1014 or 1017 through the connector 1006. In case of the eight-bit multivalue filing, the signal 1064 can be inputted to the selector 1017. On the other hand, in case of the binary filing, the signal 1064 can be inputted to the selector 1014 or 1017. In case of the binary filing, since its processing is substantially the same as that in case of the facsimile unit 4, the explanation thereof is omitted.

In case of the eight-bit multivalue filing, the output signal 1065 from the selector 1017 is inputted to the LUT 1020 through the selector 1019. In the LUT 1020, according to a desired printing density, the look-up table is formed in response to the instruction from the CPU 1003.

The output signal 1068 from the LUT 1020 is inputted to the enlargement circuit 1022 through the selector 1021. Then, the eight-bit multivalue signal 1070 which was enlarged up to the desired enlargement magnification by the enlargement circuit 1022 is sent to the reader unit 1 through the buffer 1010 and the connector 1001. The information of the file unit which was sent to the reader unit 1 is outputted to the printer unit 2 in the same manner as that in case of the facsimile unit 4. Then, the image formation is performed on the output sheet.

[Operation of Core Unit 10 Based on Information of Network Interface Unit 7]

The network interface unit 7 which interfaces with a network connected to the external apparatus 3 contains 10BASE5, 10BASE2 and 10BASE-T interfaces.

The network interface unit 7 has such the three kinds of interfaces, and the information from selected one of these interfaces is sent to the CPU 1003 through the connector 1007 and the data bus 1054. Then, the CPU 1003 performs various controlling based on contents of the sent information.

[Operation of Core Unit 10 Based on Information of Formatter Unit 8]

The formatter unit 8 has a function for explaining the command data such as the text file or the like sent from the above-described network interface unit 7, into the image data. When the data sent from the network interface unit 7 through the data bus 1054 is judged to be the data concerning the formatter unit 8, the CPU 1003 transfers such the data to the formatter unit 8 through the connector 1008. Then, the formatter unit 8 expands the transferred data into the meaningful image such as a character, a figure or the like, in the memory.

Subsequently, it will be explained the procedure that the information from the formatter unit 8 is received and then the image formation is performed on the output sheet.

The image information from the formatter unit 8 is transferred to the signal line 1064 as the multivalue signal having two values (00H, FFG). The signal 1064 is then inputted to the selectors 1014 and 1017. The selectors 1014 and 1017 are controlled responsive to the instruction from the CPU 1003. Since the following procedure is substantially the same as that in case of the facsimile unit 4, the explanation thereof is omitted.

[Operation of Core Unit 10 Based on Information of Image Memory Unit 9]

It will be explained a case where the information is outputted to the image memory unit 9.

The CPU 1003 communicates with the CPU 122 of the reader unit 1 through the communication IC 1002, to generate the original scanning instruction. Then, the reader unit 1 outputs the image information to the connector 120, by scanning the original with the scanner unit 104 in response to the original scanning instruction.

The reader unit 1 is connected to the external apparatus 3 by means of the cable, whereby the information from the reader unit 1 is inputted to the connector 1001 in the core unit 10. The image information inputted to the connector 1001 is then sent to the LUT 1011 through the eight-bit multivalue signal line 1057 and the buffer 1010.

The output signal 1059 from the LUT 1011 is then transferred to the image memory unit 9 through the selectors 1013, 1014 and 1016 and the connector 1009, as the multivalue image information. The image information stored in the image memory unit 9 is sent to the CPU 1003 through the connector 1009 and the CPU bus 1054.

The CPU 1003 transfers the data sent from the image memory unit 9, to the above-described network interface unit 7. The network interface unit 7 transfers the obtained data to the network by using desired one of the three kinds of interfaces (i.e., SCSI, RS232C and Centronics interface).

Subsequently, it will be explained a case where the information is received from the image memory unit 9.

Initially, the image information is sent from the network to the core unit 10 through the network interface unit 7. When the CPU 1003 in the core unit 10 judges the data sent from the network interface unit 7 through the CPU bus 1054 to the data concerning the image memory unit 9, the CPU 1003 transfers such the data to the image memory unit 9 through the connector 1009.

Then, the image memory unit 9 sends the eight-bit multivalue signal 1064 to the selectors 1014 and 1017 through the connector 1009. The output signal from the selector 1014 or 1017 is outputted to the printer unit 2 responsive to the instruction from the CPU 1003, in the same manner as that in case of the facsimile unit 4, and then the image formation is performed on the output sheet.

Figure 5:
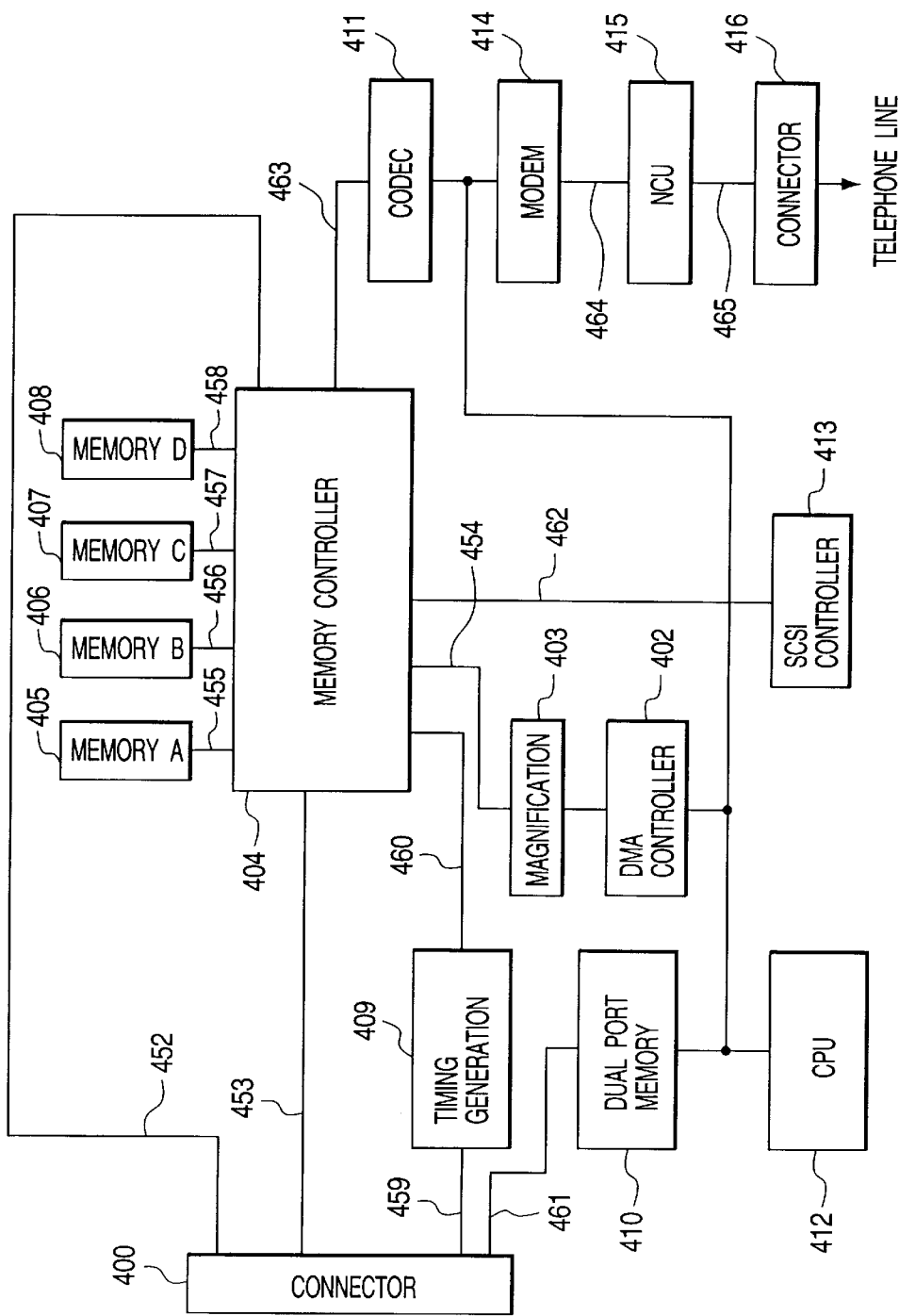
FIG. 5 is a block diagram showing structure of a facsimile unit in the above embodiment.

FIG. 5 is a block diagram showing the detailed structure of the facsimile unit 4.

The facsimile unit 4 is connected to the core unit 10 through a connector 400, to transmit and receive various signals. When the binary signal from the core unit 10 is stored in any one of memories A405, B406, C407 and D408, a signal 453 from the connector 400 is inputted to a memory controller 404. Then, under the control of the memory controller 404, the signal 453 is stored in any one of the memories A405 to D408, or in a memory obtained by cascade-connecting two couples of the memories.

The memory controller 404 has five functions which are respectively realized by a mode for transmitting/receiving the data between the memories A405 to D408 and a CPU bus 462 responsive to an instruction from a CPU 412, a mode for transmitting/receiving the data between the memories A405 to D408 and a CODEC bus 463 of a CODEC (coder decoder) 411 having encoding and decoding functions responsive to the instruction from the CPU 412, a mode for transmitting/receiving the data or contents of the memories A405 to D408 between these memories and a bus 454 from a magnification circuit 403 under the control of a DMA controller 402, a mode for storing binary video input data 454 into any one of the memories A405 to D408 under the control of a timing generation circuit 409, and a mode for reading the contents from any one of the memories A405 to D408 to output them to a signal line 452.

Each of the memories A405 to D408 has a capacity 2 MB (megabyte), and thus stores the image information corresponding to a A4-size image at resolution 400 dpi. The timing generation circuit 409 is connected to the connector 400 through a signal line 459, and initiated responsive to control signals (HSYNC, HEN, VSYNC and VEN) from the core unit 10 to generate a signal for achieving following two functions. That is, one is to store the image signal from the core unit 10 in any one or any two of the memories A405 to D408, and the other is to read the image signal from any one of the memories A405 to D408 and transfer the read signal to the signal line 452.

A dual port memory 410 is connected to the CPU 1003 of the core unit 10 through a signal line 461, and to a CPU 412 of the facsimile unit 4 through the signal line 462. The various commands are sent or managed between the CPU 1003 and the CPU 412 through the dual port memory 410.

A SCSI (small computer systems interface) controller 413 interfaces with the hard disc 11 connected to the facsimile unit 4 shown in FIG. 1, to store the data or the like at the facsimile transmission time and the facsimile reception time. The CODEC 411 reads the image information stored in any of the memories A405 to D408, and encodes the read information in a desired system such as MH (modified Huffman), MR (modified READ) or MMR (modified modified READ) system. After then, the encoded information is stored in any of the memories A405 to D408.

Further, after the encoded information stored in any of the memories A405 to D408 is read and decoded in the desired system such as the MH, MR or MMR system, the decoded information is stored in any of the memories A405 to D408 as the image information.

A MODEM (modulator and demodulator) 414 has a function for modulating the encoded information from the CODEC 411 or the hard disc connected to the SCSI controller 413 to transmit the modulated information to a telephone line, and a function for demodulating the information sent from an NCU (network control unit) 415 through a signal line 464 to convert it into the encoded information and then transfer the encoded information to the CODEC 411 or the hard disc connected to the SCSI controller 413.

The NCU 415 is directly connected to the telephone line through a signal line 465 and a connector 416, to transmit and receive the information to and from a switchboard or exchange provided in a telephone station or the like, in predetermined procedure.

An example of the facsimile transmission will be explained hereinafter. The binarization image signal from the reader unit 1 is inputted through the connector 400 and then transferred to the memory controller 404 through the signal line 453. Such the signal line 453 is stored in the memory A405 by the memory controller 404. Timing for storing the signal line 453 in the memory A405 is generated by the timing generation circuit 409 in response to the timing signal 459 from the reader unit 1.

The CPU 412 connects the memories A405 and B406 of the memory controller 404 to the bus line 463 of the CODEC 411. Then, the CODEC 411 reads the image information from the memory A405, encodes the read information in the MR system, and writes the encoded information in the memory B406. When the A4-size image information is encoded by the CODEC 411, the CPU 412 connects the memory B406 of the memory controller 404 to the CPU bus 462. Then, the CPU 412 sequentially reads the encoded information from the memory B406 and transfers the read information to the MODEM 414. The MODEM 414 modulates the encoded information and then transmits the facsimile information to the telephone line through the NCU 415.

Subsequently, an example of the facsimile reception will be explained hereinafter. The information sent from the telephone line is inputted to the NCU 415, and then connected to the facsimile unit 4 in predetermined procedure by the NCU 415. The information from the NCU 415 is inputted to the MODEM 414 to be demodulated. The CPU 412 stores the information from the MODEM 414 in the memory C407 through the CPU bus 462.

When the information of one screen is stored in the memory C407, the CPU 412 connects the data line 457 of the memory C407 to the line 463 of the CODEC 411 by controlling the memory controller 404. The CODEC 411 sequentially reads the encoded information from the memory C407 and then stores it in the memory D408 as the decoded information, i.e., image information.

The CPU 412 communicates with the CPU 1003 of the core unit 10 through the dual port memory 410, to perform the setting for the operation that the image information is outputted from the memory D408 to the printer unit 2 through the core unit 10 and then printed out.

When the setting terminates, the CPU 412 initiates the timing generation circuit 409 to generate the predetermined timing signal from the signal line 460 to the memory controller 404. Then, the memory controller 404 reads the image information from the memory D408 in synchronism with the timing signal from the timing generation circuit 409, transfers the read information to the signal line 452, and outputs the transferred information to the connector 400. The operation to output the information from the connector 400 to the printer unit 2 has been already explained in the case of the core unit 10, whereby the explanation thereof is omitted.

Figure 6:
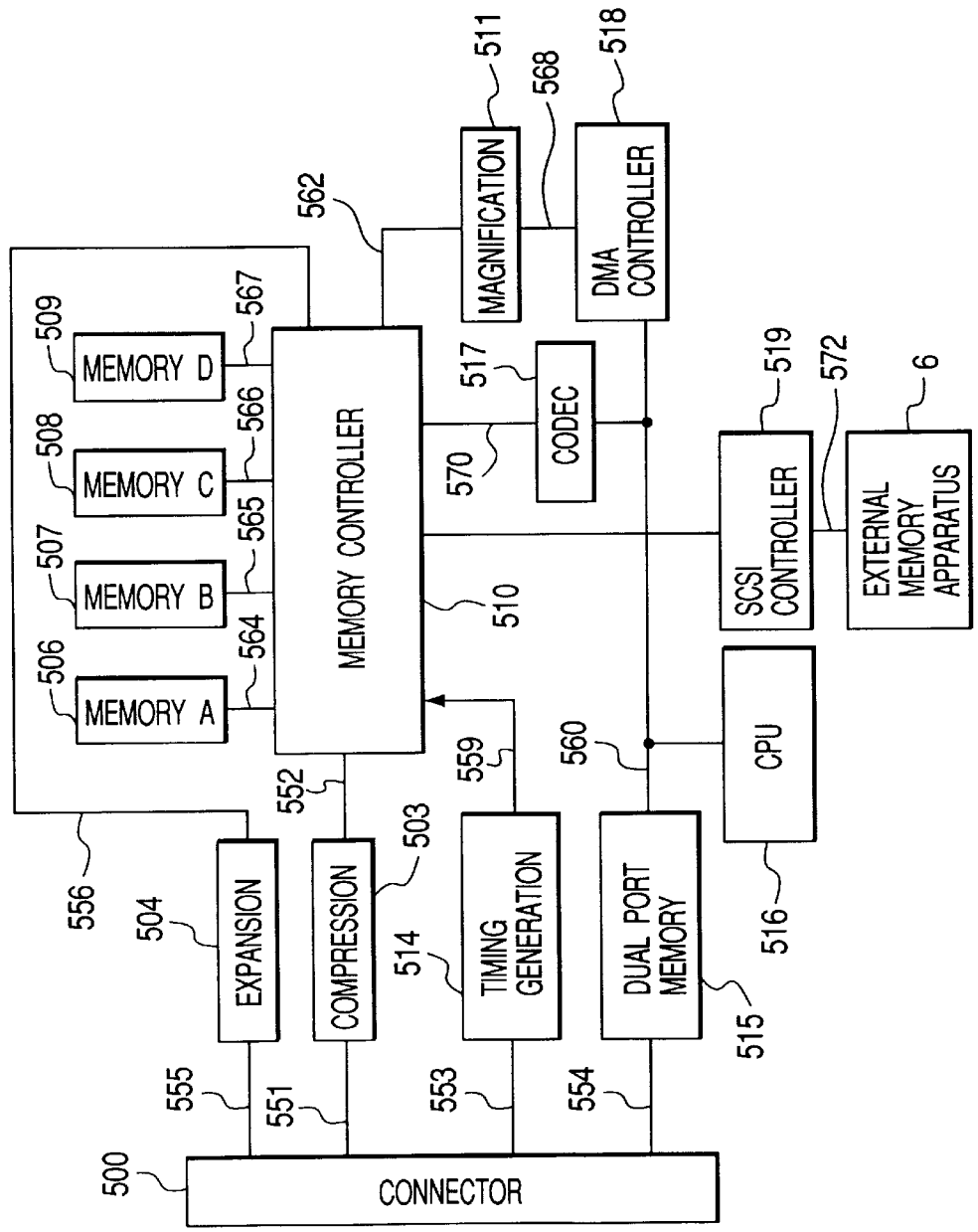
FIG. 6 is a block diagram showing structure of a file unit in the above embodiment.

FIG. 6 is a block diagram showing detailed structure of the file unit 5.

The file unit 5 is connected to the core unit 10 through a connector 500, to transmit and receive various signals therebetween. A multivalue input signal 551 is inputted to a compression circuit 503 to be converted from multivalue image information into compressed information, and then outputted to a memory controller 510. Under the control of the memory controller 510, an output signal 552 from the compression circuit 503 is stored in any one of memories A506, B507, C508 and D509, or in a memory obtained by cascade-connecting two couples of the memories.

The memory controller 510 has five functions which are respectively realized by a mode for transmitting/receiving the data between the memories A506 to D509 and a CPU bus 560 responsive to an instruction from a CPU 516, a mode for transmitting/receiving the data between the memories A506 to D509 and a CODEC bus 570 of a CODEC 517 performing encoding and decoding a mode for transmitting/receiving the data or contents of the memories A506 to D509 between these memories and a bus 562 from a magnification circuit 511 under the control of a DMA controller 518, a mode for storing the signal 552 in any one of the memories A506 to D509 under the control of a timing generation circuit 514, and a mode for reading the contents from any one of the memories A506 to D509 to output them to a signal line 556.

Each of the memories A506 to D509 has a capacity 2 MB, and thus stores the image information corresponding to the A4-size image at resolution 400 dpi.

The timing generation circuit 514 is connected to the connector 500 through a signal line 553, and initiated responsive to the control signals (HSYNC, HEN, VSYNC and VEN) from the core unit 10 to generate a signal for achieving following two functions. That is, one is to store the information from the core unit 10 in any one or any two of the memories A506 to D509, and the other is to read the image information from any one of the memories A506 to D509 and transfer the read information to the signal line 556.

A dual port memory 515 is connected to the CPU 1003 of the core unit 10 through a signal line 554, and to the CPU 516 of the file unit 5 through the signal line 560. The various commands are sent or managed between the CPU 1003 and the CPU 516 through the dual port memory 515. An SCSI controller 519 interfaces with the external memory apparatus 6 connected to the file unit 5 shown in FIG. 1.

The external memory apparatus 6 is concretely composed of a magneto-optical disc to store the data such as the image information and the like. The CODEC 517 reads the image information stored in any of the memories A506 to D509, and encodes the read information in the desired system such as the MH, MR or MMR system. After then, the encoded information is stored in any of the memories A506 to D509 as the encoded information. Further, after the encoded information stored in any of the memories A506 to D509 is read and decoded in the desired system such as the MH, MR or MMR system, the decoded information is stored in any of the memories A506 to D509 as the image information.

Subsequently, an example of storing the file information in the external memory apparatus 6 will be explained. The eight-bit multivalue image signal from the reader unit 1 is inputted to the compression circuit 503 through the connector 500 and the signal line 551. The signal 551 inputted in the compression circuit 503 is converted into the compressed information 552. Then, the compressed information 552 is inputted to the memory controller 510.

The memory controller 510 causes the timing generation circuit 514 to generate a timing signal 559, responsive to the signal 553 from the core unit 10. Then, according to the timing signal 559, the compressed signal 552 is stored in the memory A506. The CPU 516 connects the memories A506 and B507 of the memory controller 510 to the bus line 570 of the CODEC 517.

Then, the CODEC 517 reads the compressed information from the memory A506, encodes the read information in the MR system, and writes the encoded information to the memory B507. When the CODEC 517 terminates the encoding, the CPU 516 connects the memory B507 of the memory controller 510 to the CPU bus 560.

The CPU 516 sequentially reads the encoded information from the memory B507, and transfers the read information to the SCSI controller 519. Then, the SCSI controller 519 stores encoded information 572 in the external memory apparatus 6.

Subsequently, an example of fetching the information from the external memory apparatus 6 and outputting it to the printer unit 2 will be explained. When a command as to information searching and printing is received, the CPU 516 receives the encoded information from the external memory apparatus 6 through the SCSI controller 519 and then transfers such the encoded information to the memory C508. At that time, the memory controller 510 connects the CPU bus 560 to a bus 566 of the memory C508 in response to the instruction from the CPU 516.

When the transferring of the encoded information to the memory C508 terminates, the CPU 516 connects the memories C508 and D509 to the bus 570 of the CODEC 517 by controlling the memory controller 510. After the CODEC 517 reads the encoded information from the memory C508 and sequentially decodes the read information, the obtained information is transferred to the memory D509. In a case where the magnification or zooming such as enlarging, reducing or the like is necessary to output the information to the printer unit 2, the memory D509 is connected to the bus 562 of the magnification circuit 511, and the contents of the memory D509 are zoomed under the control of the DMA controller 518.

The CPU 516 communicates with the CPU 1003 of the core unit 10 through the dual port memory 515, to perform the setting for the operation that the image information is outputted from the memory D509 to the printer unit 2 through the core unit 10 and then printed out. When such the setting terminates, the CPU 516 initiates the timing generation circuit 514 to generate the predetermined timing signal from the signal line 559 to the memory controller 510.

Then, the memory controller 510 reads decoded information from the memory D509 in synchronism with the timing signal from the timing generation circuit 514, and transfers it to the signal line 556. The transferred information is inputted to an expansion circuit 504 through the signal line 556 to be expanded. Then, the output signal 555 from the expansion circuit 504 is outputted to the core unit 10 through the connector 500. The operation to output the information from the connector 500 to the printer unit 2 has been already explained in the case of the core unit 10, whereby the explanation thereof is omitted.

Figure 7:
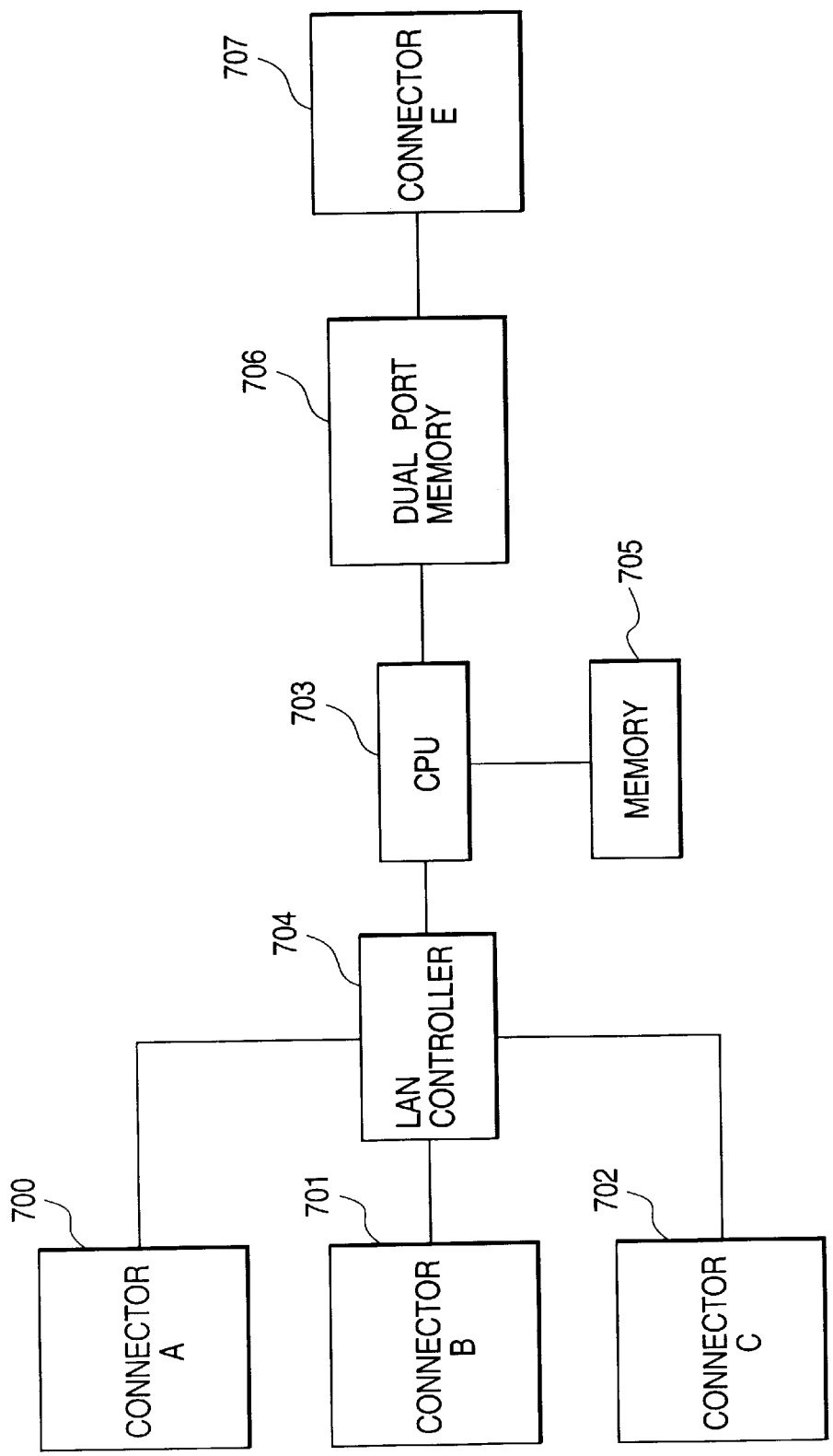
FIG. 7 is a block diagram showing structure of a network interface unit in the above embodiment.

Subsequently, the network interface unit 7 will be explained with reference to FIG. 7.

A connector A700 is the connector used for a 10BASE5 Ethernet interface, a connector B701 is the connector used for a 10BASE2 Ethernet interface, and a connector C702 is the connector used for a 10BASE-T Ethernet interface.

One of these three connectors is selected to physically connect the network interface unit 7 to the Ethernet. As a CPU 703 refers to a volatile or non-volatile memory contained in a memory 705, it controls an Ethernet interface controller to perform the communication. A connector E707 is connected to the core unit 10, whereby the CPU 703 communicates with the core unit 10 through a dual port memory 706.

Figure 8:
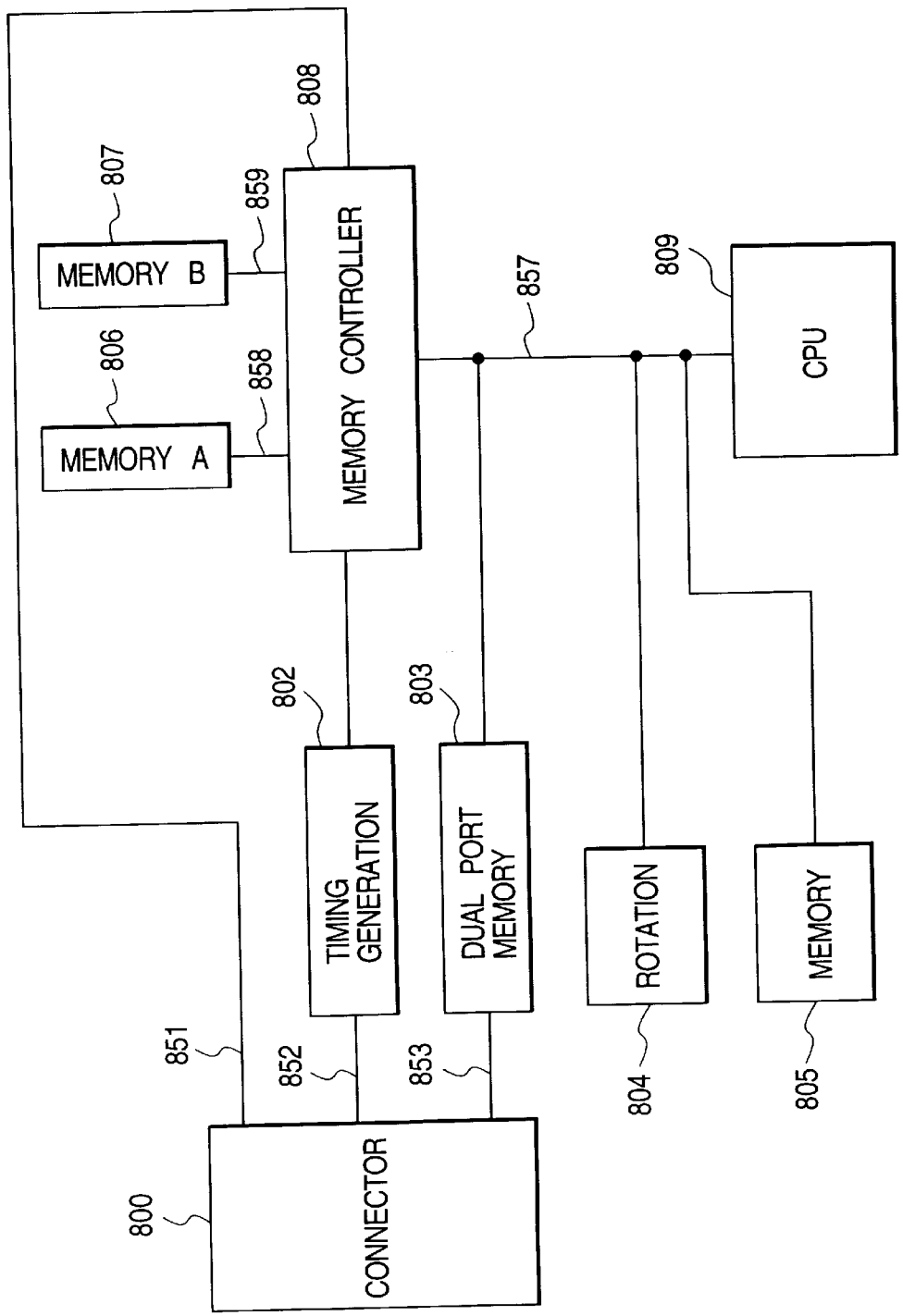
FIG. 8 is a block diagram showing structure of a formatter unit in the above embodiment.

FIG. 8 is a block diagram showing structure of the formatter unit 8. The structure and operation of the formatter unit 8 will be explained with reference to FIG. 8.

The data from the above-described network interface unit 7 is judged by the core unit 10. If such data concerns the formatter unit 8, the CPU 1003 of the core unit 10 transfers the data from the network to a dual port memory 803 through the connector 1008 of the core unit 10 and a connector 900 of the formatter unit 9.

A CPU 809 of the formatter unit 8 receives the code data sent from the network through the dual port memory 803. The CPU 809 sequentially expands the code data into image data, and transfers the image data to a memory A806 or B807 through a memory controller 808.

Each of the memories A806 and B807 has a capacity 1 MB and can correspond to the image up to an A4 size at resolution 300 dpi.

In order to make each memory correspondent to an A3 sheet at resolution 300 dpi, the memories A806 and B807 are cascade-connected to each other and the image data is expanded. These memories are controlled by the memory controller 808 in response to the instruction from the CPU 809.

Further, if it is necessary to rotate a character, a figure and the like when the image data is expanded, the image data is rotated by a rotation circuit 804 and then transferred to the memory A806 or B807. When the image data expanding in the memory A806 or B807 terminates, the CPU 809 controls the memory controller 808 to connect a data bus line 858 of the memory A806 or a data bus line 859 of the memory B807 to an output line of the memory controller 808.

Subsequently, the CPU 809 communicates with the CPU 1003 of the core unit 10 through the dual port memory 803 to set a mode for outputting the image information from the memory A806 or B807. The CPU 1003 of the core unit 10 sets a print output mode for the CPU 122, by using a communication function contained in the CPU 12 of the reader unit 1 through the communication IC 1002 in the core unit 10.

When the print output mode is set, the CPU 1003 of the core unit 10 initiates a timing generation circuit 802 through the connector 1008 and the connector 800 of the formatter unit 8. Then, the timing generation circuit 802 generates a timing signal to the memory controller 808 in response to the signal from the core unit 10, so as to read the image information from the memory A806 or B807.

The image information from the memory A806 or B807 is inputted to the memory controller 808 through a signal line 858 or 859. The output image information from the memory controller 808 is transferred to the core unit 10 through a signal line 851 and the connector 800. The outputting of the information from the core unit 10 to the printer unit 2 has been already explained in the case of the core unit 10, whereby the explanation thereof is omitted.

Figure 9:
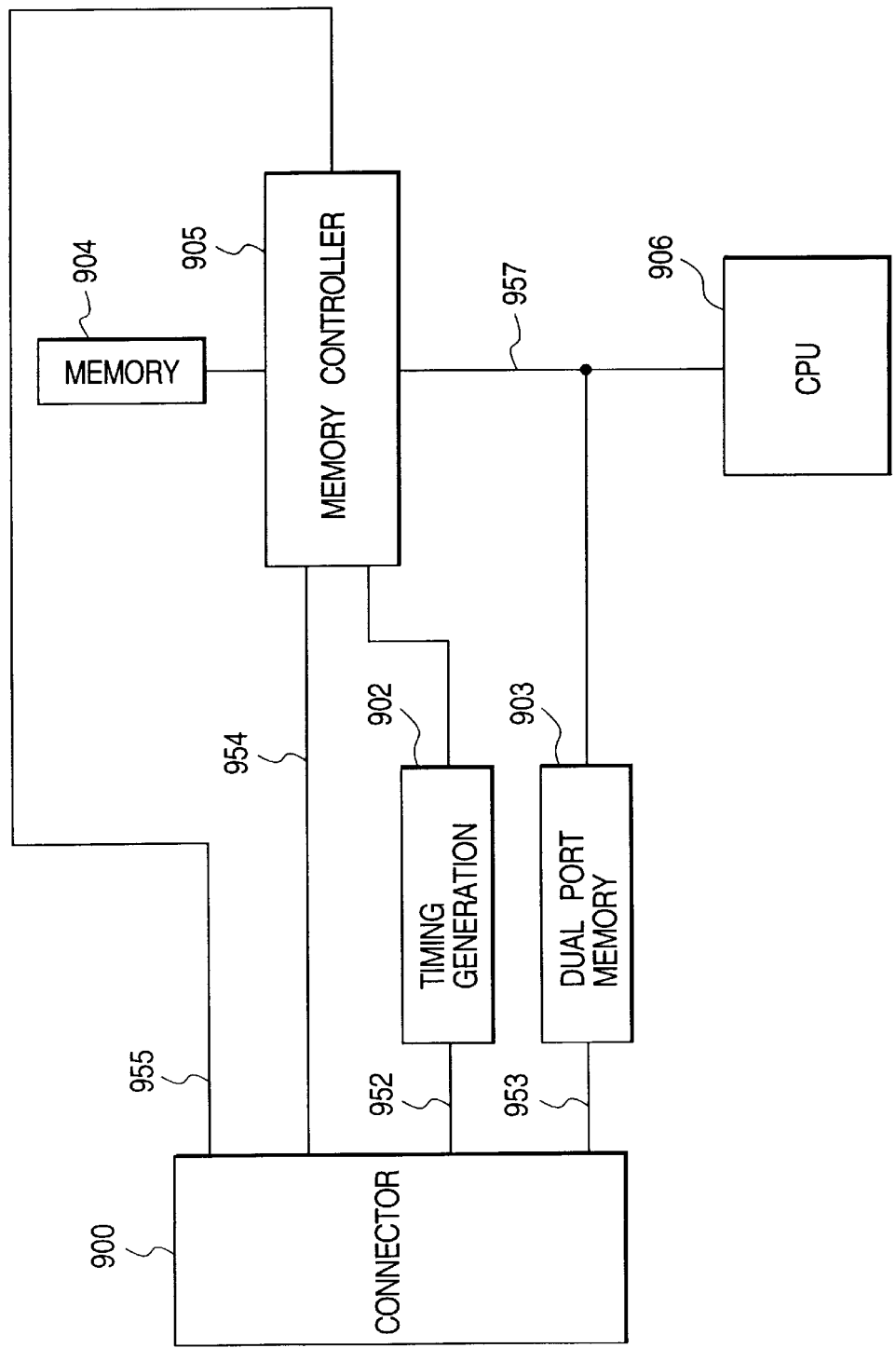
FIG. 9 is a block diagram showing structure of an image memory unit in the above embodiment.

Subsequently the, structure and operation of the image memory unit 9 will be explained with reference to a block diagram shown in FIG. 9.

The image memory unit 9 is connected to the core unit 10 through a connector 900 to handle various signals. A multivalue input signal 954 is stored in a memory 904 under the control of a memory controller 905.

The memory controller 905 has three functions which are respectively realized by a mode for transmitting/receiving the data between the memory 904 and a CPU bus 957 response to an instruction from a CPU 906, a mode for storing the signal 954 under the control of a timing generation circuit 902, and a mode for reading the memory contents from the memory 904 and outputting them to a signal line 955.

The memory 904 has a capacity 32 MB and stores the image corresponding to A3 size at resolution 400 dpi and 256 gradations. The timing generation circuit 902 is connected to the connector 900 through a signal line 952, and initiated responsive to the control signals (HSYNC, HEN, VSYNC and VEN) from the core unit 10, to generate a signal for achieving the following two functions.

That is, one is to store the information from the core unit 10 in the memory 904, and the other is to read the image information from the memory 904 and send it to the signal line 955.

The CPU 1003 of the core unit 10 and the CPU 906 of the image memory unit 9 are connected to a dual port memory 903 through a signal line 953 and the signal line 957, respectively. The CPUs 1003 and 906 handle various commands therebetween through the dual port memory 903.

Subsequently, an example will be explained wherein the image information is stored in the image memory unit 9 and then transferred to the network. The eight-bit multivalue image signal from the reader unit 1 is inputted from the connector 900, and then inputted to the memory controller 905 through the signal line 954. The memory controller 905 causes the timing generation circuit 902 to generate the timing signal 956 responsive to the signal 952 from the core unit 10. Then, the signal 954 is stored in the memory 904 according to the generated timing signal.

The CPU 906 connects the memory 904 of the memory controller 905 to the CPU bus 957. Further, the CPU 906 sequentially reads the image information from the memory 904, and transfers the read information to the dual port memory 903.

The CPU 1003 of the core unit 10 reads the image information from the dual port memory 903 of the image memory unit 9 through the signal line 953 and the connector 900, and transfers the read information to the network interface unit 7. The transferring of the information from the network interface unit 7 to the network has been already explained in the previous disclosure, whereby the explanation thereof is omitted.

Subsequently, an example will be explained wherein the image information sent from the network is outputted to the printer unit 2. The image information sent from the network to the core unit 10 through the network interface unit 7. Then, the CPU 1003 of the core unit 10 transfers the image information to the dual port memory 903 of the image memory unit 9 through the CPU bus 1054 and the connector 1009.

At that time, the CPU 906 controls the memory controller 905 to connect the CPU bus 957 to the bus of the memory 904. The CPU 906 transfers the image information from the dual port memory 903 to the memory 904 through the memory controller 905. When the transferring of the image information to the memory 904 terminates, the CPU 906 controls the memory controller 905 to connect the data line (i.e., bus) of the memory 904 to the signal line 955.

The CPU 906 communicates with the CPU 1003 of the core unit 10 through the dual port memory 903, to perform the setting for the operation that the image information is outputted from the memory 904 to the printer unit 2 through the core unit 10 and then printed out. When such setting terminates, the CPU 906 initiates the timing generation circuit 902 to generate a predetermined timing signal from the signal line 956 to the memory controller 905.

Then, the memory controller 905 reads the image information from the memory 904 in synchronism with the timing signal from the timing generation circuit 902, and output read information to the connector 900 through the signal line 955. The operation to output the information from the connector 900 to the printer unit 2 has been already explained in the case of the core unit 10, whereby the explanation thereof is omitted.

Subsequently, a sort function which constitutes a characteristic part of the multi-functional image processing apparatus according to the present invention will be explained.

The multi-functional image processing apparatus judges whether or not the sort printing is to be executed, on the basis of the designation of sort processing and tray number and the result as to whether or not the sheet remains on the sorter.

In the embodiment, it will be explained that, on the basis of three application softwares (i.e., applications 1, 2 and 3), the printing on the three sheets are performed and then the staple processing is finally performed by using the sorter. It should be noted that a driver software capable of cooperating with these plural application softwares has been stored in a storage medium of the computer.

Figure 11:
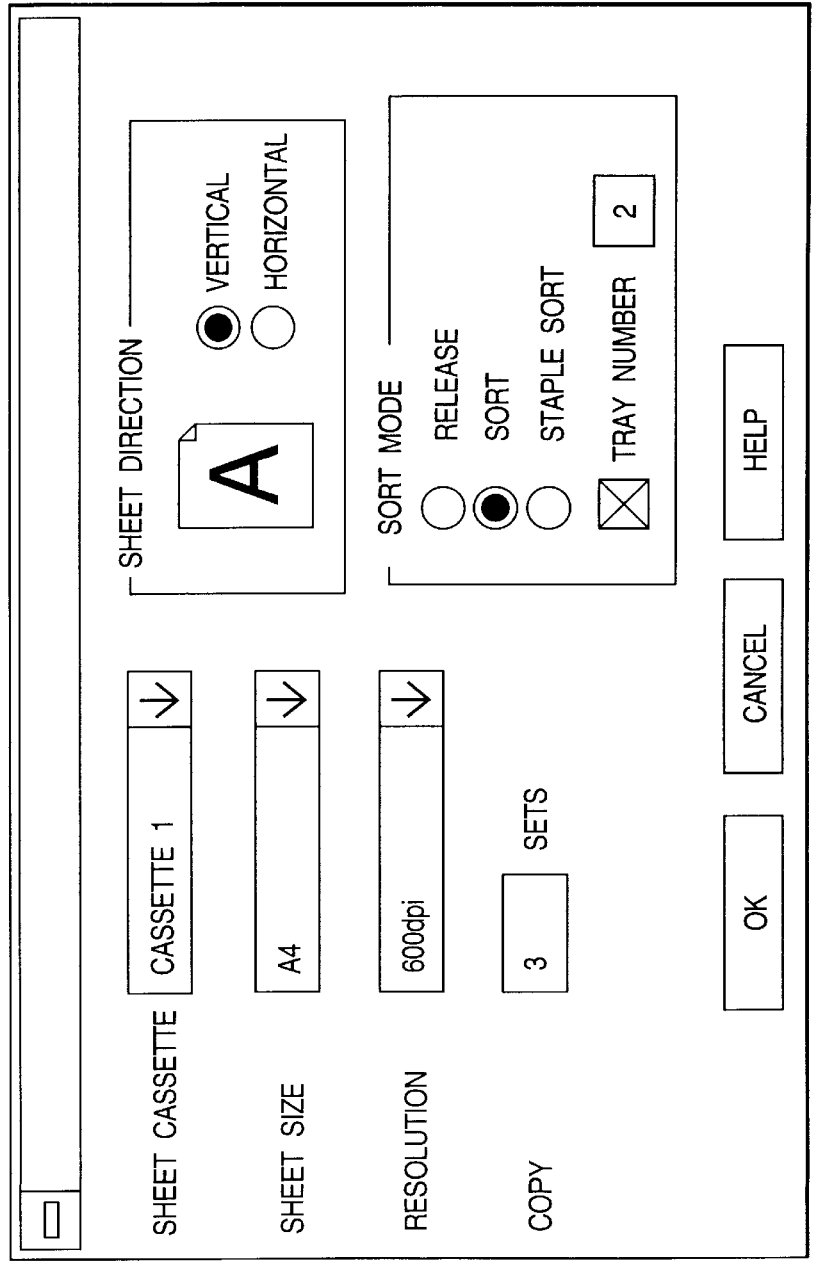
FIG. 11 is a view for explaining a printer driver screen in which a sort processing and a tray number are designated, in the above embodiment.

When the printing is selected from a computer application menu, the printer driver shown in FIG. 11 is displayed. The printer driver is to generate a printer control command for controlling each function contained in the multi-functional image processing apparatus, and a drawing instructive command for causing the formatter unit 8 to generate the print image.

In the printer control command, each item inputted or selected on the printer driver screen is described in syntax which can be understood by the multi-functional image processing apparatus. In the drawing instructive command, the drawing instruction of the application software is converted into the command which can be interpreted by the formatter unit 8.

On the printer driver screen, "sheet cassette", "sheet size", "sheet direction", "resolution", "the number of copies", "sort mode" and "tray number" can be selected.

The "sheet cassette" is used to designate one of the plural sheet cassettes contained in the multi-functional image processing apparatus. The multi-functional image processing apparatus continues to feed or supply the sheets from the designated sheet cassette until all the page data are printed. The "sheet size" indicates the sheet size of the original to be printed, and the "sheet direction" indicates the drawing direction.

The "resolution" indicates the print resolution of the multi-functional image processing apparatus, the "the number of copies" is used to input the number of printing. The "sort mode" indicates the sort execution, and the "tray number" indicates the tray number from which the printing sheet outputting starts. When the "sort mode" and the "tray number" are selected, the sort printing is executed with use of the designated tray and the subsequent trays corresponding to the number of printing.

Initially, by the application 1, a one-page original is printed by three. The setting on the printer driver screen is shown in FIG. 11. In order to start the sheet outputting from a tray 2 and execute the sort processing, "sort" is selected in the "sort mode", and a check box is checked and then "2" is inputted at the "tray number". Thus, a print job shown in FIG. 12 is formed.

In a flowchart of FIG. 17, such the print job sent from the network interface unit 7 is received by the core unit 10 (step S1). Then, the core unit 10 separates the printer control command and the drawing instructive command from each other (step S2), and transfers the drawing instructive command to the formatter unit 8 (step S3).

The core unit 10 determines a kind of the sort on the basis of the sorter mode command and the tray number command in the printer control command (steps S4 and S5).

Since the sort processing "3" and the tray number "2" have been designated in FIG. 12, when the core unit 10 receives a drawing processing completion notification from the formatter unit 8 (step S8), the printing is executed and the output sheets are sorted by the sorter (step S9).

Figure 18A:
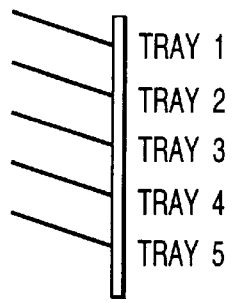
FIGS. 18A, 18B, 18C, 18D and 18E are views for explaining printed results on a sorter, in the above embodiment.
Figure 18B:
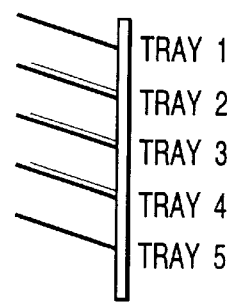

FIG. 18B is a view for explaining the sorting result by the sorter.

Subsequently, by the application 2, a two-page original is printed by three. The setting on the printer driver screen at this time is shown in FIG. 11. Like the previous processing, in order to execute the sort processing from the tray number 2, the "sort" is selected in the "sort mode", and the check box is checked and then "2" is inputted at the "tray number". Thus, the print job shown in FIG. 12 is formed.

The core unit 10 which received such the print job from the network interface unit 7 (step S1) separates the printer control command and the drawing instructive command from each other (step S2), and transfers the drawing instructive command to the formatter unit 8 (step S3). The core unit 10 determines the kind of the sort on the basis of the sorter mode command and the tray number command in the printer control command (steps S4 and S5). Since the sort processing and the tray number "2" have been designated in FIG. 12, when the core unit 10 receives the drawing processing completion notification from the formatter unit 8 (step S8), the printing is executed and the output sheets are sorted by the sorter (step S9).

Figure 18C:
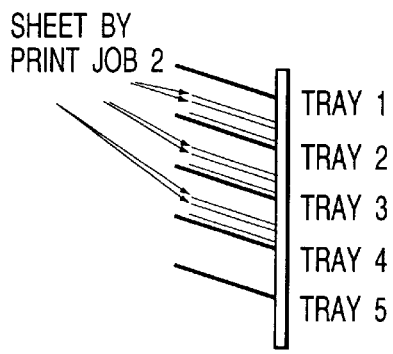

The sorting result by the sorter is shown in FIG. 18C. The print sheets outputted by the application 2 are discharged on the print sheets outputted by the application 1. That is, the later-printed sheets are stacked on the previously printed sheets.

Figure 13:
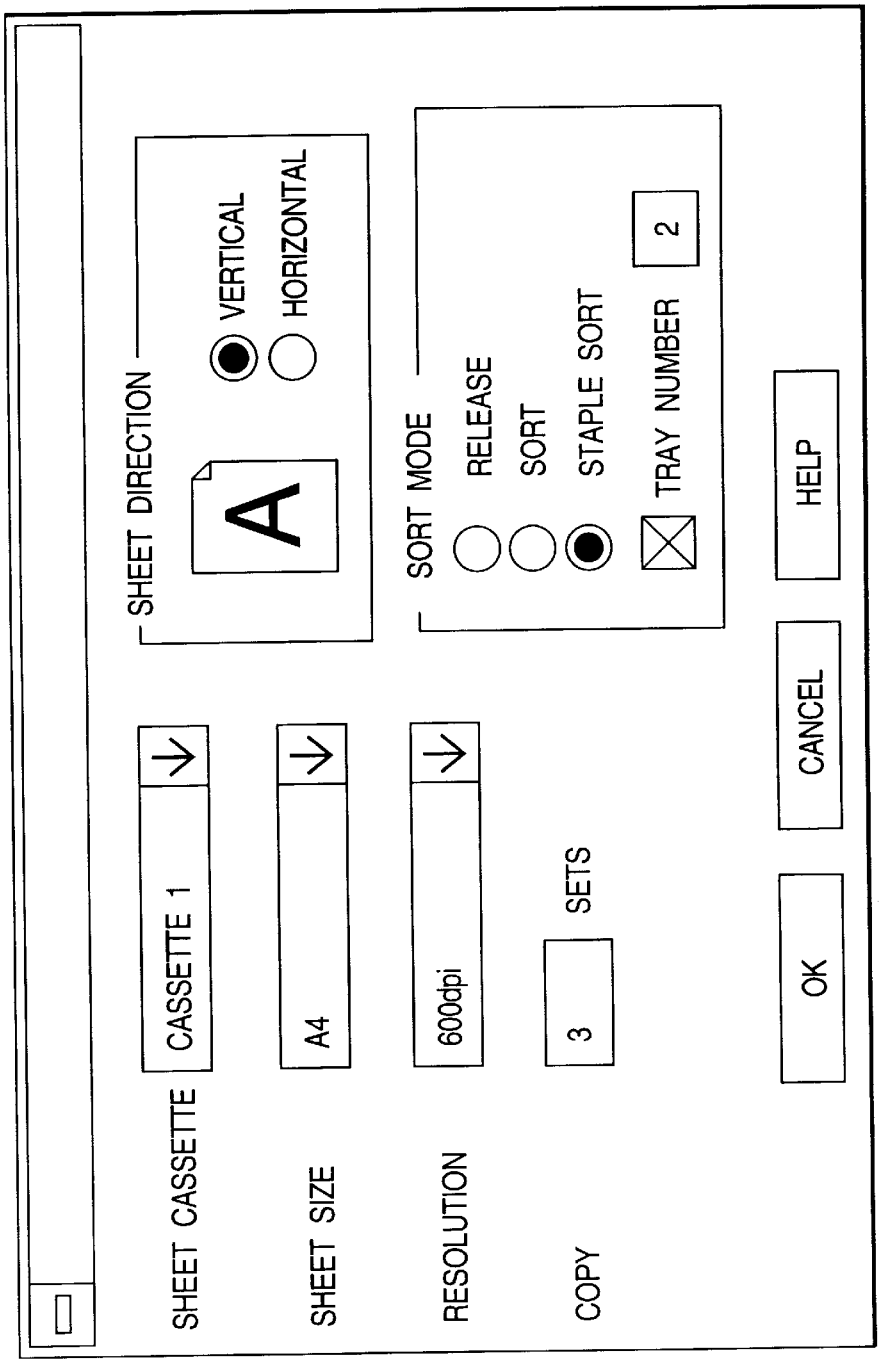
FIG. 13 is a view for explaining the printer driver screen in which a staple sort processing and the tray number are designated, in the above embodiment.

Subsequently, by the application 3, a three-page original is printed by three. The setting on the printer driver screen at this time is shown in FIG. 13. In order to execute the sort processing from the tray number 2 and finally execute also the stapling, "staple sort" is selected in the "sort mode", and the check box is checked and then "2" is inputted at the "tray number". Thus, a print job shown in FIG. 14 is formed.

The core unit 10 which received such the print job from the network interface unit 7 (step S1 in FIG. 17) separates the printer control command and the drawing instructive command from each other (step S2), and transfers the drawing instructive command to the formatter unit 8 (step S3). The core unit 10 determines the kind of the sort on the basis of the sorter mode command and the tray number command in the printer control command (steps S4 and S5). Since the staple sort processing and the tray number "2" have been designated in FIG. 14, when the core unit 10 receives the drawing processing completion notification from the formatter unit 8 (step S8), the printing is executed, and the stapling is executed after the output sheets are sorted by the sorter (step S9).

Figure 18D:
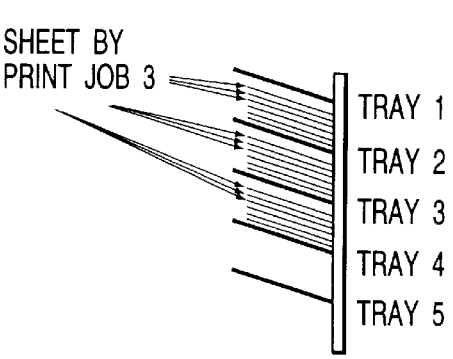

FIG. 18D is a view for explaining the sorting result by the sorter. That is, the stapling is executed each five sheets stacked on each tray.

Figure 15:
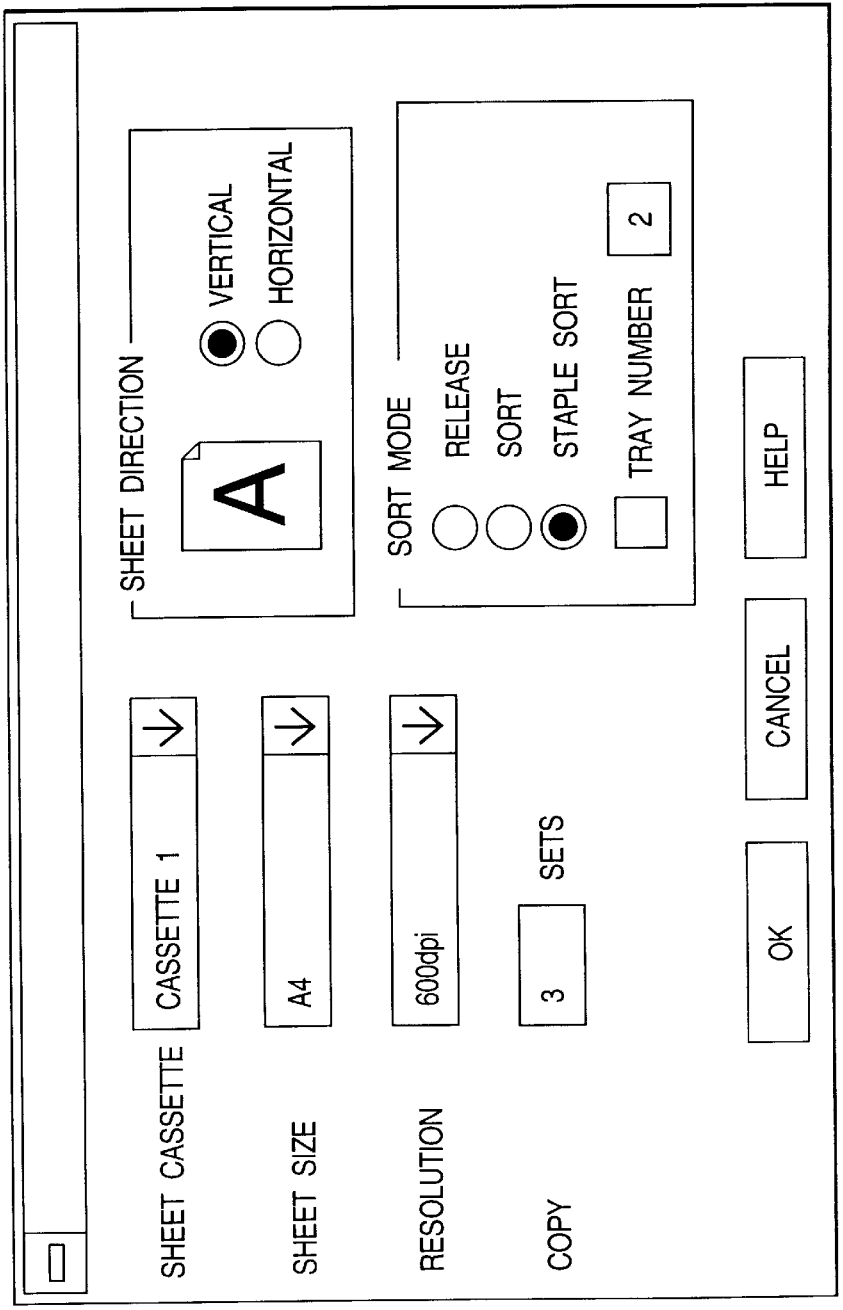
FIG. 15 is a view for explaining the printer driver screen in which only the staple sort processing is designated, in the above embodiment.

In this case, if the print setting by the application 3 is changed to that shown in FIG. 15, it is considered in the changed setting that the tray number is not yet designated. Therefore, if the sheet remains on the tray, the core unit 10 does not execute the sort processing. In a print job of FIG. 16 which is formed based on the setting of FIG. 15, since the tray number is "0", the core unit 10 judges that there is no designation of the tray number. Instead of indication showing designation or no designation of the tray number, there may be indication showing that the sheets printed according to the print instructions of the plural application softwares are discharged on one tray.

Figure 10:
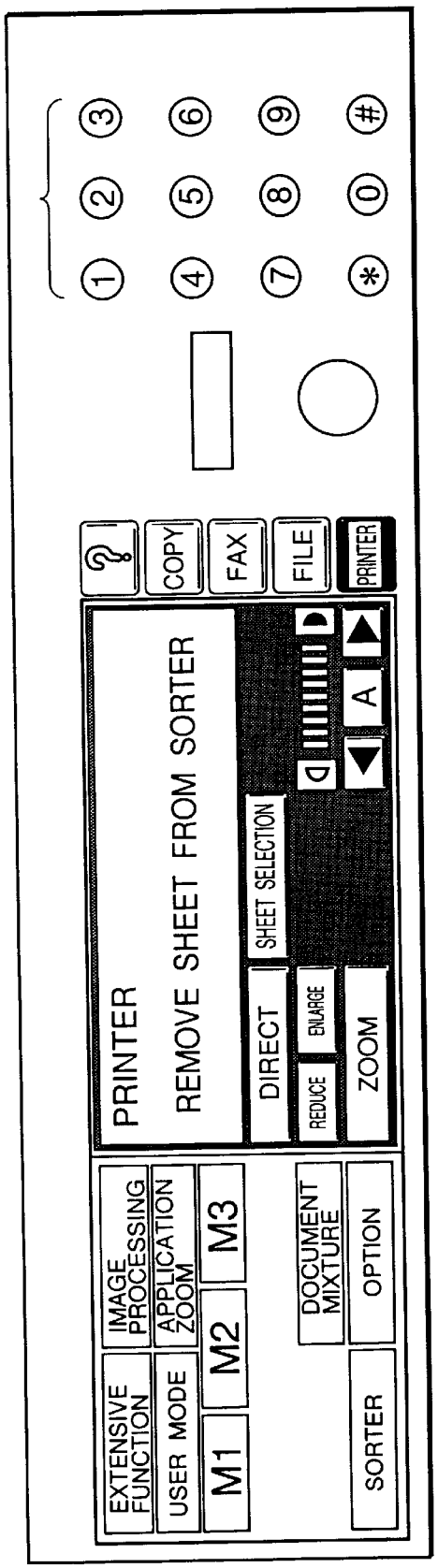
FIG. 10 is a view showing a configuration of an operation screen in the above embodiment.

For this reason, according to the detection result of the sensor 222, a judgement processing is executed to judge whether or not the sheet remains on the tray (step S6). The sheets printed by the applications 1 and 2 still stack respectively on the trays 2, 3 and 4 of the sorter (FIG. 18D). Therefore, the core unit 10 displays, on an operation panel of the multi-functional image processing apparatus, a message to ask an operator to remove the sheets. Such displayed message is shown in FIG. 10.

When the sheets printed by the applications 1 and 2 are removed from the sorter and the core unit 10 receives the drawing processing completion notification from the formatter unit 8 (step S8), the printing is executed. Then, the stapling is executed after the sheets are sorted by the sorter (step S9).

Figure 18E:
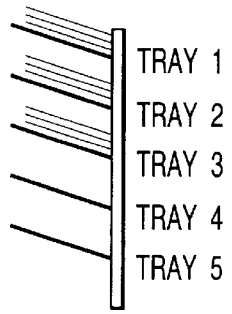

FIG. 18E is a view showing the sorting result by the sorter. In this print job, since there is no designation of the tray number, the sort processing starts from the tray 1.

Further, in any of the applications 1, 2 and 3, if "release" is designated in the "sort mode", the image data which was drawing-processed by the formatter unit 8 (step S10) is not sort-processed. Thus, all the pages of the image are printed and discharged on the tray 1 (step S11).

What is claimed is:

1. An image formation apparatus comprising:
   input means for inputting an image and instructions from an external apparatus connected to said image formation apparatus;
   image formation means for forming the image, inputted by said input means, on a sheet;
   stacking means for stacking the sheets on which the images have been formed by said image formation means on a stacking unit;
   detection means for detecting that a stacked sheet is present on said stacking unit; and
   control means for inhibiting the sheet stacking onto said stacking means if said input means does not input the instructions and said detection means detects the stacked sheet, and allowing the sheet stacking onto said stacking unit on which the sheet has already been stacked, if said input means inputs the instructions and said detection means detects the stacked sheet.

2. An apparatus according to claim 1, wherein said control means inhibits the image formation operation of said image formation means according to that said input means does not input the instructions and said detection means detects the sheet stacking, until said detection means does not detect the sheet stacking.

3. An apparatus according to claim 1, wherein said stacking means has plural stacking units, and said input means inputs as the instructions an instruction to designate the stacking unit.

4. An apparatus according to claim 1, wherein said input means inputs the instructions from a driver in a computer connected to said image formation apparatus.

5. An image formation apparatus comprising:

input means for inputting an image and instructions from an external apparatus connected to said image formation apparatus;

image formation means for forming the image, inputted by said input means, on a sheet;

stacking means for stacking the sheets on which the images have been formed by said image formation means;

detection means for detecting that a stacked sheet is present on said stacking means; and control means for inhibiting the sheet stacking onto said stacking means if said input means does not input the instructions and said detection means detects the stacked sheet, and allowing the sheet stacking onto said stacking unit on which the sheet has been stacked if said input means inputs the instructions and said detection means detects the stacked sheet, wherein said input means can input the instructions respectively from a plurality of software programs in a computer connected to said image formation apparatus.

6. A control method of an image formation apparatus which forms an image on a sheet and discharges the sheet on which the image has been formed onto a tray, said method comprising the steps of:

inputting the image and instructions from an external apparatus connected to the image formation apparatus;

detecting whether a stacked sheet is present on the tray;

inhibiting the sheet stacking onto the tray if an image formation start instruction is inputted in a state that the instructions are not inputted and the stacked sheet is present on the tray; and allowing the sheet stacking onto the tray on which the sheet has been stacked, if the image formation start instruction is inputted in a state that the instructions are inputted and the stacked sheet is present on the tray.

7. A method according to claim 6, wherein, in said third step, the image formation operation is inhibited until the sheet on the tray is removed.

8. A method according to claim 6, wherein the image formation apparatus has the plural trays, and the instructions is to designate the tray to which the sheet is discharged.

9. A method according to claim 6, wherein the instructions is inputted from a driver of a computer connected to the image formation apparatus.

10. A control method of an image formation apparatus which forms an image on a sheet and discharges the sheet on which the image has been formed onto a tray, said method comprising the steps of:

inputting the image and instructions from an external apparatus connected to the image formation apparatus;

detecting whether the stacked the sheet is present on the tray;

inhibiting the sheet stacking onto the tray if an image formation start instruction is inputted in a state that the instructions are not inputted and the stacked sheet is present on the tray; and allowing the sheet stacking onto the tray on which the sheet has been stacked if the image formation start instruction is inputted in a state that the instructions are inputted and the stacked sheet is present on the tray, wherein the respective predetermined instructions can be inputted from a plurality of softwares of a computer connected to the image formation apparatus.

11. A storage medium which stores a driver software capable of cooperating with plural application softwares for outputting instructions, in an image formation apparatus of claim 1.

* * * * *

UNITED STATES PATENT AND TRADEMARK OFFICE
CERTIFICATE OF CORRECTION

PATENT NO. : 6,041,199

DATED : March 21, 2000

INVENTOR(S) : YOSHIMASA KASHIMADA

It is certified that error appears in the above-identified patent and that said Letters Patent is hereby corrected as shown below:

COLUMN 3
Line 32, "image" should read --images--.

COLUMN 12
Line 10, "ther-" should read --there--; and
Line 11, "ebetween." should read --between.--.

COLUMN 14
Line 65, "Subsequently the," should read --Subsequently, the--.

COLUMN 15
Line 13, "32 MB" should read --32MB--.

UNITED STATES PATENT AND TRADEMARK OFFICE
CERTIFICATE OF CORRECTION

PATENT NO. : 6,014,199

DATED : March 21, 2000

INVENTOR(S) : YOSHIMASA KASHIMADA

It is certified that error appears in the above-identified patent and that said Letters Patent is hereby corrected as shown below:

COLUMN 18
Line 52, "means" (first occurrence) should read --unit--.

COLUMN 19
Line 20, "unit" should read --means--.

COLUMN 20
Line 30, "predetermined" should be deleted.

Signed and Sealed this

Seventeenth Day of April, 2001

NICHOLAS P. GODICI

*Attest:*

*Attesting Officer*  Acting Director of the United States Patent and Trademark Office